US012555189B2

(12) United States Patent
Wang et al.

(10) Patent No.: US 12,555,189 B2
(45) Date of Patent: Feb. 17, 2026

(54) IMAGE RECOVERY PROCESSOR UTILIZING FRAMEWORK FOR GENERATING SPARSITY REGULARIZERS FOR IMAGE RESTORATION

(71) Applicant: City University of Hong Kong, Hong Kong (HK)

(72) Inventors: Zhiyong Wang, Hong Kong (HK); Hing Cheung So, Hong Kong (HK); Abdelhak M. Zoubir, Mainz (DE)

(73) Assignee: City University of Hong Kong, Hong Kong (HK)

( * ) Notice: Subject to any disclaimer, the term of this patent is extended or adjusted under 35 U.S.C. 154(b) by 348 days.

(21) Appl. No.: 18/446,444

(22) Filed: Aug. 8, 2023

(65) Prior Publication Data

US 2025/0061543 A1    Feb. 20, 2025

(51) Int. Cl.
*G06T 5/00* (2024.01)
*G06V 10/75* (2022.01)
(Continued)

(52) U.S. Cl.
CPC .............. *G06T 5/00* (2013.01); *G06V 10/751* (2022.01); *G06V 10/771* (2022.01); *G06V 10/776* (2022.01); *G06T 2207/10036* (2013.01)

(58) Field of Classification Search
CPC . G06T 2207/10036; G06T 5/00; G06F 17/16; G06V 10/751; G06V 10/771; G06V 10/776; G06V 10/7715
See application file for complete search history.

(56) References Cited

U.S. PATENT DOCUMENTS 8,935,308 B2    1/2015  Porikli et al.
9,734,601 B2 *  8/2017  Bresler ................. G06T 11/006
                        (Continued)

OTHER PUBLICATIONS

Patrick L. Combettes et al., Signal recovery by proximal forward-backward splitting, SIAM J. Multiscale Model. Simul., 2005, vol. 4, No. 4, p. 1168-1200.

(Continued)

*Primary Examiner* — Ming Y Hon
*Assistant Examiner* — Amanda H Pearson
(74) *Attorney, Agent, or Firm* — Idea Intellectual Limited; Sam T. Yip

(57) ABSTRACT

An image restoration processor includes an image receiver, a matrix converter, a framework memory, a modifier, a matrix decomposer, and an image reconstructor. The image receiver receives one or more degraded images. The matrix converter reshapes image data of the one or more degraded images into one or more target matrices. The framework memory stores a framework for generating one or more sparsity-inducing regularizers. The modifier reads the framework memory and applies the framework to modify an M-estimator and accordingly output a hybrid M-estimator as well as the corresponding sparse regularizer. The matrix decomposer receives the one or more target matrices and the sparse regularizer and to apply the sparse regularizer to RPCA via decomposing one of the one or more target matrices into a sum of low-rank and sparse matrices. The image reconstructor integrates outcomes of decomposition from the matrix decomposer to form one or more recovered images.

20 Claims, 17 Drawing Sheets

(51) Int. Cl.
    *G06V 10/771* (2022.01)
    *G06V 10/776* (2022.01)

(56) References Cited

U.S. PATENT DOCUMENTS

| | | | |
|---|---|---|---|
| 10,229,092 B2 | 3/2019 | Zeng et al. | |
| 10,430,929 B2 | 10/2019 | Zeng et al. | |
| 2018/0172788 A1* | 6/2018 | Levine | G01R 33/4835 |
| 2018/0239966 A1* | 8/2018 | Xiao | G06F 18/2113 |

OTHER PUBLICATIONS

José M. Bioucas-Dias et al., A New TwIST: Two-Step Iterative Shrinkage/Thresholding Algorithms for Image Restoration, IEEE Transactions on Image Processing, 2007, vol. 16, No. 12, p. 2992-3004.
Patrick L. Combettes et al., Proximal thresholding algorithm for minimization over orthonormal bases, SIAM J. Optim., 2007, vol. 18, No. 4, p. 1351-1376.
John Wright et al., Sparse Representation for Computer Vision and Pattern Recognition, Proceedings of the IEEE, 2010, vol. 98, No. 6, p. 1031-1044.
Rick Chartrand, Fast algorithms for nonconvex compressive sensing: MRI reconstruction from very few data, Proc. IEEE Int. Symp. Biomed. Imag., 2009, p. 262-265.
Ran He et al., Recovery of Corrupted Low-Rank Matrices via Half-Quadratic based Nonconvex Minimization, Proc. IEEE Conf. Comput. Vis. Pattern Recognit., 2011, p. 2889-2896.
Donald Geman et al., Nonlinear Image Recovery with Half-Quadratic Regularization, IEEE Transactions on Image Processing, 1995, vol. 4, No. 7, p. 932-946.
Stephen Boyd et al., Convex Optimization, Cambridge University Press, 2004.
Ran He et al., Maximum Correntropy Criterion for Robust Face Recognition, IEEE Transactions on Pattern Analysis and Machine Intelligence, 2011, vol. 33, No. 8, p. 1561-1576.
Weifeng Liu et al., Correntropy: Properties and Applications in Non-Gaussian Signal Processing, IEEE Transactions on Signal Processing, 2007, vol. 55, No. 11, p. 5286-5298.
Bin Dong et al., An Efficient Algorithm for 10 Minimization in Wavelet Frame Based Image Restoration, J. Sci. Comput., 2013, vol. 54, p. 350-368.
Hédy Attouch et al., Proximal Alternating Minimization and Projection Methods for Nonconvex Problems: An Approach Based on the Kurdyka-Lojasiewicz Inequality, Mathematics of Operations Research, 2010, vol. 35, No. 2, p. 438-457.
Renwei Dian et al., Deep Hyperspectral Image Sharpening, IEEE Transactions on Neural Networks and Learning Systems, 2018, vol. 29, No. 11, p. 5345-5355.
Jiangjun Peng et al., Exact Decomposition of Joint Low Rankness and Local Smoothness Plus Sparse Matrices, IEEE Transactions on Pattern Analysis and Machine Intelligence, 2023, vol. 45, No. 5, p. 5766-5781.
Fumihito Yasuma et al., Generalized Assorted Pixel Camera: Postcapture Control of Resolution, Dynamic Range, and Spectrum, IEEE Transactions on Image Processing, 2010, vol. 19, No. 9, p. 2241-2253.
Ayan Chakrabarti et al., Statistics of Real-World Hyperspectral Images, Proc. IEEE Conf. Comput. Vis. Pattern Recognit., 2011, p. 193-200.
Emmanuel J. Candès et al., Robust Principal Component Analysis?, Journal of the ACM, 2011, vol. 58, No. 3, Article 11, p. 1-37.
Shuhang Gu et al., Weighted Nuclear Norm Minimization and Its Applications to Low Level Vision, International Journal of Computer Vision, 2017, vol. 121, p. 183-208.
Fei Wen et al., Robust PCA Using Generalized Nonconvex Regularization, IEEE Transactions on Circuits and Systems for Video Technology, 2020, vol. 30, No. 6, p. 1497-1510.
Fanhua Shang et al., Bilinear Factor Matrix Norm Minimization for Robust PCA: Algorithms and Applications, IEEE Transactions on Pattern Analysis and Machine Intelligence, 2018, vol. 40, No. 9, p. 2066-2080.
Rick Chartrand, Nonconvex Splitting for Regularized Low-Rank + Sparse Decomposition, IEEE Transactions on Signal Processing, 2012, vol. 60, No. 11, p. 5810-5819.
Canyi Lu et al., Nonconvex Nonsmooth Low Rank Minimization via Iteratively Reweighted Nuclear Norm, IEEE Transactions on Image Processing, 2016, vol. 25, No. 2, p. 829-839.
Ran He et al., Robust Recovery of Corrupted Low-Rank Matrix by Implicit Regularizers, IEEE Transactions on Pattern Analysis and Machine Intelligence, 2014, vol. 36, No. 4, p. 770-783.
Heinz H. Bauschke et al., Convex Analysis and Monotone Operator Theory in Hilbert Spaces, Springer, 2011, New York, NY, USA.
Mila Nikolova et al., Analysis of Half-quadratic Minimization Methods for Signal and Image Recovery, SIAM Journal on Scientific Computing, 2005, vol. 27, No. 3, p. 937-966.
R. Tyrrell Rockafellar et al., Variational Analysis, Springer, 2004, 2nd ed., Berlin, Germany.
Robert G. Bartle et al., Introduction to Real Analysis, Wiley, 2011, 4th ed., Hoboken, NJ, USA.
I. T. Jolliffe, Principal Component Analysis (Springer Series in Statistics), Springer-Verlag, 2002, New York, NY, USA.
Namrata Vaswani et al., Rethinking PCA for Modern Data Sets: Theory, Algorithms, and Applications, Proceedings of the IEEE, 2018, vol. 106, No. 8, p. 1274-1276.
Yu-Ying Zhao et al., HTRPCA: Hypergraph Regularized Tensor Robust Principal Component Analysis for Sample Clustering in Tumor Omics Data, Interdisciplinary Sciences: Computational Life Sciences , 2022, vol. 14, p. 22-33.
Thierry Bouwmans et al., On the Applications of Robust PCA in Image and Video Processing, Proceedings of the IEEE, 2018, vol. 106, No. 8, p. 1427-1457.
John Wright et al., Robust Principal Component Analysis: Exact Recovery of Corrupted Low-Rank Matrices by Convex Optimization, Proc. Adv. Neural Inf. Process. Syst., 2009, p. 2080-2088.
Wei He et al., Hyperspectral Image Denoising via Noise-Adjusted Iterative Low-Rank Matrix Approximation, IEEE Journal of Selected Topics in Applied Earth Observations and Remote Sensing, 2015, vol. 8, No. 6, p. 3050-3061.
Hongyan Zhang et al., Hyperspectral Image Restoration Using Low-Rank Matrix Recovery, IEEE Transactions on Geoscience and Remote Sensing, 2014, vol. 52, No. 8, p. 4729-4743.
Qian Sun et al., Robust Principal Component Analysis via Capped Norms, Proc. 19th Int. Conf. Knowl. Discovery Data Mining, 2013, p. 311-319.
Thierry Bouwmans et al., Decomposition into low-rank plus additive matrices for background/foreground separation: A review for a comparative evaluation with a large-scale dataset, Computer Science Review, 2017, vol. 23, p. 1-71.
Xiaowei Zhou et al, Moving Object Detection by Detecting Contiguous Outliers in the Low-Rank Representation, IEEE Transactions on Pattern Analysis and Machine Intelligence, 2013, vol. 35, No. 3, p. 597-610.
Venkat Chandrasekaran et al., Rank sparsity incoherence for matrix decomposition, SIAM J. Optimization, 2011, vol. 21, No. 2, p. 572-596.
Xiaoming Yuan et al., Sparse and Low-Rank Matrix Decomposition via Alternating Direction Method, Pacific J. Optim., 2013, vol. 9, No. 1, p. 167-180.
Eunwoo Kim et al., Efficient 11-Norm-Based Low-Rank Matrix Approximations for Large-Scale Problems Using Alternating Rectified Gradient Method, IEEE Transactions on Neural Networks and Learning Systems, 2015, vol. 26, No. 2, p. 237-251.
Huahua Wang et al., Parallel Direction Method of Multipliers, Proc. Adv. Neural Inf. Process. Syst., 2014, p. 181-189.
Zhouchen Lin et al., Linearized Alternating Direction Method with Adaptive Penalty for Low-Rank Representation, Proc. 24th Int. Conf. Neural Inf. Process. Syst., 2011, p. 612-620.
Jian-Feng Cai et al., A singular value thresholding algorithm for matrix completion, SIAM J. Opt., 2010, vol. 20, No. 4, p. 1956-1982.

(56) References Cited

OTHER PUBLICATIONS

Zhouchen Lin et al., Fast convex optimization algorithms for exact recovery of a corrupted lowrank matrix, UIUC Technical Report, 2009, UILU-EN G-09-2214, p. 1-18.

Shuhang Gu et al., Weighted Nuclear Norm Minimization with Application to Image Denoising, Proc. IEEE Conf. Comput. Vis. Pattern Recognit., 2014, p. 2862-2869.

Shusen Wang et al., Nonconvex Relaxation Approaches to Robust Matrix Recovery, Proceedings of the Twenty-Third International Joint Conference on Artificial Intelligence, 2013, p. 1764-1770.

Yuan Xie et al., Weighted Schatten p-Norm Minimization for Image Denoising and Background Subtraction, IEEE Transactions on Image Processing, 2016, vol. 25, No. 10, p. 4842-4857.

Emmanuel J. Candès et al., Enhancing Sparsity by Reweighted l1 Minimization, J. Fourier Anal. Appl., 2008, vol. 14, p. 877-905.

Praveen Kumar Pokala et al., Iteratively Reweighted Minimax-Concave Penalty Minimization for Accurate Low-rank Plus Sparse Matrix Decomposition, IEEE Transactions on Pattern Analysis and Machine Intelligence, 2022, vol. 44, No. 12, p. 8992-9010.

Cun-hui Zhang, Nearly unbiased variable selection under minimax concave penalty, The Annals of Statistics, 2010, vol. 38, No. 2, p. 894-942.

Canyi Lu et al., Generalized Nonconvex Nonsmooth Low-Rank Minimization, Proc. IEEE Conf. Comput. Vis. Pattern Recog., 2014, p. 4130-4137.

Canyi Lu et al., Generalized Singular Value Thresholding, Proceedings of the Twenty-Ninth AAAI Conference on Artificial Intelligence, 2015, p. 1805-1811.

Pinghua Gong et al., A General Iterative Shrinkage and Thresholding Algorithm for Non-convex Regularized Optimization Problems, Proceedings of the 30th International Conference on Machine Learning, 2013, p. 37-45.

Quanming Yao et al., Large-Scale Low-Rank Matrix Learning with Nonconvex Regularizers, IEEE Transactions on Pattern Analysis and Machine Intelligence, 2019, vol. 41, No. 11, p. 2628-2643.

Quanming Yao et al., Fast Low-Rank Matrix Learning with Nonconvex Regularization, IEEE International Conference on Data Mining, 2015, p. 539-548.

Jianqing Fan et al., Variable Selection via Nonconcave Penalized Likelihood and Its Oracle Properties, Journal of the American Statistical Association, 2001, vol. 96, No. 456, p. 1348-1360.

Fei Wen et al., Nonconvex Regularized Robust PCA Using the Proximal Block Coordinate Descent Algorithm, IEEE Transactions on Signal Processing, 2019, vol. 67, No. 20, p. 5402-5416.

Fanhua Shang et al., Scalable Algorithms for Tractable Schatten Quasi-Norm Minimization, Proceedings of the Thirtieth AAAI Conference on Artificial Intelligence, 2016, p. 2016-2022.

Cuixia Gao et al., A Feasible Nonconvex Relaxation Approach to Feature Selection, Proceedings of the Twenty-Fifth AAAI Conference on Artificial Intelligence, 2011, p. 356-361.

Joshua Trzasko et al., Highly Undersampled Magnetic Resonance Image Reconstruction via Homotopic l0-Minimization, IEEE Transactions on Medical Imaging, 2009, vol. 28, No. 1, p. 106-121.

Ran He et al., Half-Quadratic-Based Iterative Minimization for Robust Sparse Representation, IEEE Transactions on Pattern Analysis and Machine Intelligence, 2014, vol. 36, No. 2, p. 261-275.

Naiyang Guan et al., Truncated Cauchy Non-Negative Matrix Factorization, IEEE Transactions on Pattern Analysis and Machine Intelligence, 2019, vol. 41, No. 1, p. 246-259.

Xuelong Li et al., Robust Subspace Clustering by Cauchy Loss Function, IEEE Transactions on Neural Networks and Learning Systems, 2019, vol. 30, No. 7, p. 2067-2078.

Stuart Geman et al., Bayesian image analysis: An application to single photon emission tomography, Proceedings of the American Statistical Association, 1985, p. 12-18.

Heng Tao Shen et al., Half-Quadratic Minimization for Unsupervised Feature Selection on Incomplete Data, IEEE Transactions on Neural Networks and Learning Systems, 2021, vol. 32, No. 7, p. 3122-3135.

Zhi-Yong Wang et al., Robust Matrix Completion Based on Factorization and Truncated-Quadratic Loss Function, IEEE Transactions on Circuits and Systems for Video Technology, 2023, vol. 33, No. 4, p. 1521-1534.

\* cited by examiner

Algorithm 1 Robust PCA via sparsity-inducing regularizers (SIR)

Input: $X, \rho^0 > 0, \mu > 1, \xi > 0$
Initialize: $M^0 = X, \Lambda^0 = 0,$ and $k = 0$.
while $\|X - M^{k+1} - E^{k+1}\|_F / \|X\|_F > \xi$ do
$\quad E^{k+1} = p_{\varphi_{\cdot,\lambda}/\rho^k}\left(X - M^k + \frac{\Lambda^k}{\rho^k}\right)$
$\quad M^{k+1} = p_{\|\cdot\|_{\varphi_{\cdot,1}/\rho^k}}\left(X - E^{k+1} + \frac{\Lambda^k}{\rho^k}\right)$
$\quad \Lambda^{k+1} = \Lambda^k + \rho^k(X - M^{k+1} - E^{k+1})$
$\quad \rho^{k+1} = \mu \rho^k$
$\quad k \leftarrow k + 1$
end while
Output: $M^k$ and $E^k$.

FIG. 5

IMAGE RECOVERY PROCESSOR UTILIZING FRAMEWORK FOR GENERATING SPARSITY REGULARIZERS FOR IMAGE RESTORATION

TECHNICAL FIELD

The present invention generally relates to techniques for image recovery. More specifically, the present invention relates to an image restoration processor applying a framework to generation of sparsity regularizers for image recovery.

BACKGROUND

Principal component analysis (PCA) refers to seeking an underlying low-dimensional linear subspace from high-dimensional data. It is widely used for dimensionality reduction, and abounds in many applications such as computer vision, bioinformatics, as well as signal and image processing. Although PCA works well in the presence of zero-mean Gaussian noise, it is vulnerable to outliers. To overcome this drawback, robust PCA (RPCA) is proposed to decompose the outlier-contaminated data into a sum of low-rank and sparse matrices. RPCA has been applied in hyperspectral image restoration, shadow removal and video separation, to mention a few. The low-rank plus sparse decomposition model can be considered as a weighted linear combination of rank and $\ell_0$-norm minimization problem, which is NP-hard. To address the issue, a common method is to replace the rank function and the $\ell_0$-norm with the nuclear norm and the $\ell_1$-norm, respectively, leading to a convex optimization formulation, which is known as principal component pursuit (PCP). Besides, it is proved that minimizing the weighted linear combination of the nuclear norm and $\ell_1$-norm minimization attains exact low-rank and sparse component recovery with high probability, if the incoherence conditions are satisfied. To solve PCP, many efficient algorithms based on singular value thresholding (SVT), accelerated proximal gradient and augmented Lagrange multipliers, are developed.

Convex relaxations are relatively easy in optimization, but their estimates are known to be biased. For example, when the nuclear norm is employed to find the low-rank component, it underestimates all nonzero singular values and shrinks them with the same constant. It has been shown that shrinking less the larger singular values will attain better restoration performance in image denoising and inpainting, as well as background subtraction. There are two main strategies to alleviate the bias induced by the nuclear norm. The first is to weigh the singular values differently via updating the weights per iteration, which is similar to the reweighted $\ell_1$ minimization. One of related works extends this technique to low-rank matrix approximation, and adopts a weighted nuclear norm minimization (WNNM) as a surrogate to rank minimization and $\ell_1$-norm to resist outliers. Besides, the weighted Schatten-p-norm minimization as a generalization of WNNM is suggested. Moreover, to facilitate weight adaption, a weighted minimax-concave penalty (WMCP) is developed, which uses a clever trick to unfold the minimax-concave penalty (MCP) and utilizes the alternating direction method of multipliers (ADMM) to find the solution.

The second strategy employs nonconvex sparsity-inducing regularizers to reduce the estimation bias. Many studies have shown the superiority of nonconvex regularizers over the convex relaxation approaches. One of the studies develops a fast proximal algorithm with nonconvex regularizers such as the smoothly clipped absolute deviation (SCAD) and MCP, for low-rank matrix learning. One of the studies suggests robust PCA via adopting the $\ell_p$-norm (0<p≤1) as the regularizers to impose constraints on the low-rank and sparse terms, but the $\ell_p$-norm does not have a closed-form expression for its proximal operator, except for three special cases of $$p = \left\{\frac{1}{2}, \frac{2}{3}, 1\right\}.$$

A modified $\ell_p$-norm is then devised to impose low-rank and sparse constraints to achieve the low-rank and sparse decomposition, resulting in good performance in background separation. In addition, other nonconvex regularizers, including the exponential-type penalty (ETP) and the Laplace function, are applied for low-rank matrix recovery via iteratively reweighted nuclear norm. Nevertheless, neither of them has the explicit expressions for their corresponding proximal operators.

Although numerous nonconvex regularizers have been suggested, they still have the aforementioned limitations. The field of low-rank matrix recovery faces challenges in handling large-scale datasets, complex noise models, and incomplete or corrupted data. Traditional methods may not be sufficient in addressing these challenges, necessitating the development of novel approaches that can effectively handle these issues and provide accurate recovery results.

SUMMARY OF INVENTION

It is an objective of the present invention to provide an apparatus and a method to address the aforementioned issues in the prior arts.

In accordance with one aspect of the present invention, an image restoration processor is provided. The image restoration processor includes an image receiver, a matrix converter, a framework memory, a modifier, a matrix decomposer, and an image reconstructor. The image receiver is configured to receive one or more degraded images. The matrix converter is configured to reshape image data of the one or more degraded images into one or more target matrices. The framework memory is configured to store a framework for generating one or more sparsity-inducing regularizers, which enables generation of the one or more sparsity-inducing regularizers and derivation of their theoretical properties and closed-form proximity operators. The modifier is configured to read the framework memory and apply the framework to modify an M-estimator, accordingly output a hybrid M-estimator and the corresponding sparse regularizer. The matrix decomposer is configured to receive the one or more target matrices and the sparse regularizer and to apply the sparse regularizer to a robust principal component analysis (RPCA) approach via decomposing one of the one or more target matrices into a sum of low-rank and sparse matrices. The image reconstructor integrates outcomes of decomposition from the matrix decomposer to form one or more recovered images from the one or more degraded images, utilizing the low-rank and sparse matrices.

In accordance with one aspect of the present invention, an image restoration processor is provided. The image restoration processor includes an image receiver, a matrix converter, a framework memory, a modifier, a matrix decomposer, an image reconstructor, and an image selector. The image receiver is configured to receive one degraded image. The matrix converter is configured to reshape image data of the degraded image into a target matrix. The framework memory is configured to store a framework for generating one or more sparsity-inducing regularizers, which enables generation of the one or more sparsity-inducing regularizers and derivation of their theoretical properties and closed-form proximity operators. The modifier is configured to read the framework memory and apply the framework to modify more than one M-estimator and accordingly output more than one hybrid M-estimator and more than one sparse regularizer corresponding to the more than one hybrid M-estimator. The matrix decomposer is configured to receive the target matrix and the different sparse regularizers and to apply the different sparse regularizers to a robust principal component analysis (RPCA) approach via decomposing the matrix into sums of low-rank and sparse matrices. The image reconstructor integrates outcomes of decomposition from the matrix decomposer to form more than one recovered image from the degraded image using different sparse regularizers, utilizing the low-rank and sparse matrices. The image selector is configured to receive the recovered images from the reconstructor and determine which one of the recovered images is to be outputted according to image evaluation metrics for all of the recovered images.

In one embodiment, a framework is devised to generate different nonconvex sparsity-inducing regularizers under some relatively mild conditions. Although the resultant regularizers may be nonconvex, it can be proven that their Moreau envelopes are convex, and their analytical solutions are given. In addition, the framework is applied to three popular M-estimators, namely, Welsch, Cauchy and German-McClure, to generate the corresponding sparse regularizers, because they have achieved considerable success in image restoration, compressed sensing and subspace clustering. Although these M-estimators provide implicit regularizers (IRs) via half-quadratic optimization, sparsity cannot be achieved (See Appendix A). While the sparsity promoting regularizers associated with the three M-estimators are generated in this work. Moreover, an effective strategy is derived for the hyperparameter selection and their physical meanings are explained.

The sparse regularizers generated in the framework of the present invention can be considered as nonconvex surrogates to enforce low-rank-plus-sparse decomposition. Different from PCP and WNNM based RPCA (WNNM-RPCA), which both employ the $\ell_1$-norm to combat sparse outliers, the devised nonconvex regularizers are adopted in the present invention. The resultant optimization problem is tackled via ADMM with convergence guarantees. Briefly, there are contributions provided via the above configuration:
(1) A framework to generate sparsity-inducing regularizers is introduced, and their theoretical properties as well as proximity operators in closed-form are derived.
(2) The framework is applied to Welsch, Cauchy and German-McClure functions to generate three different sparsity-promoting regularizers, and their parameter selection is analyzed.
(3) The sparse regularizers are then employed to attain low-rank plus sparse decomposition, resulting in ADMM based algorithms with theoretical guarantees.
(4) Extensive experiments on both synthetic and real-life data are conducted to verify effectiveness.

BRIEF DESCRIPTION OF DRAWINGS

Embodiments of the invention are described in more details hereinafter with reference to the drawings, in which:

FIG. 5 depicts Algorithm 1 which describes the preceding optimization steps according to various embodiments of the present invention;

DETAILED DESCRIPTION OF THE INVENTION

Figure 1:
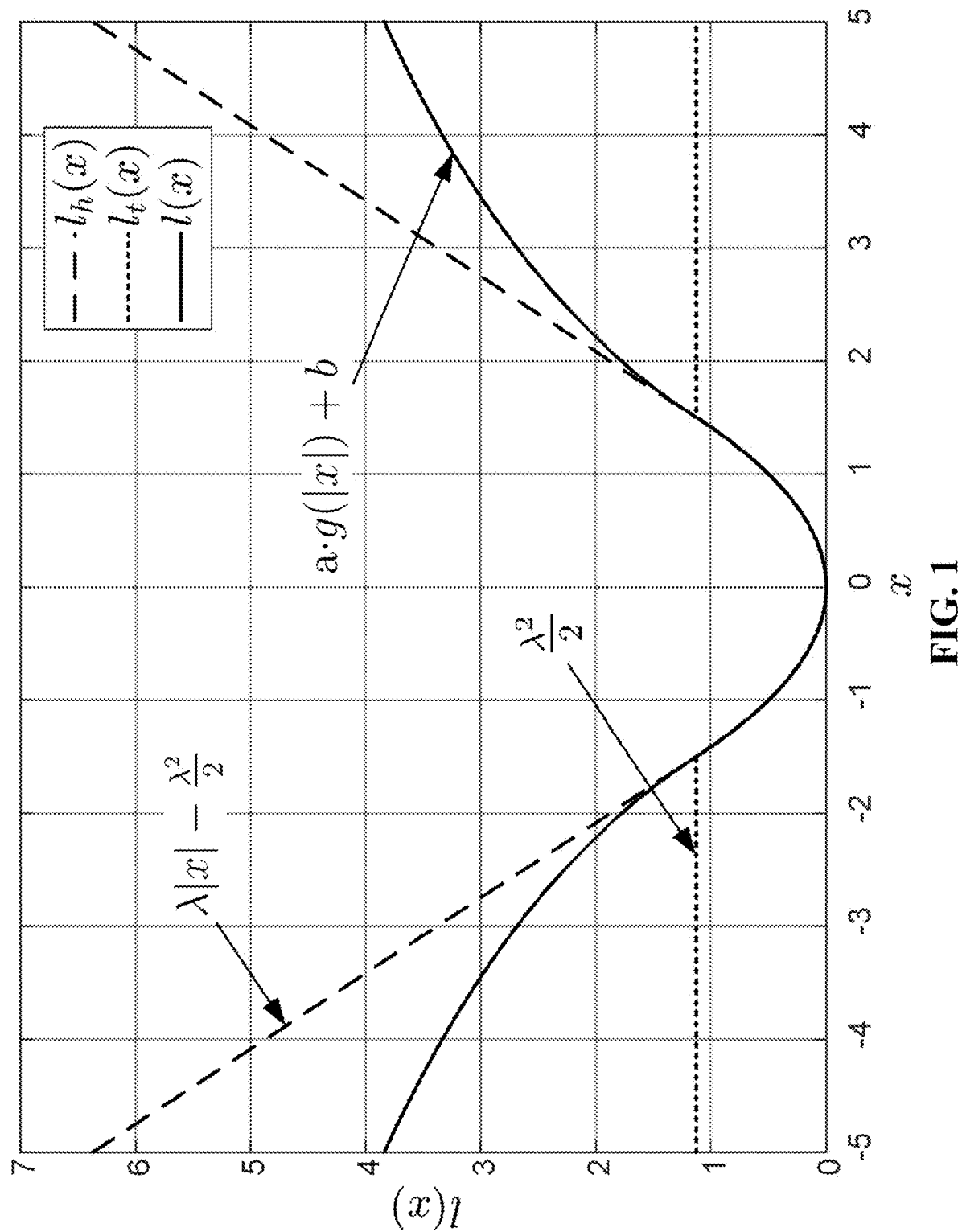
FIG. 1 illustrates the curves of Huber and truncated-quadratic functions.

In the following description, image restoration processors using framework for generating sparsity-inducing regularizers and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

For clearer illustrations of the embodiments of the present invention, notations and basic operations are stated before the descriptions of the embodiments.

A) Notations:

Scalars and matrices are represented by italic and bold upper-case letters, respectively. The (i, j) entry of a matrix A is denoted by $A_{ij}$, and $(\cdot)^T$ is the transpose operator. In addition, $\|A\|_F = \sqrt{\sum_{i=1}^m \sum_{j=1}^n A_{ij}^2}$ is the Frobenius norm of $A \in \mathbb{R}^{m \times n}$ and unless stated otherwise, the matrix norm refers to the Frobenius norm, i.e., $\|A\| = \|A\|_F$. The first and second derivatives of a differentiable function g(x) are represented by g'(x) and g''(x), respectively. Moreover, $|\alpha|$ stands for the absolute value of a, and a refers to the set of subgradients, which reduces to the derivative for differentiable functions.

B) Related Works:

(1) Robust PCA: to make PCA combat outliers, RPCA is developed by decomposing the degraded matrix into a sum of low-rank and sparse matrices. Many studies have shown that such decomposition can be exactly attained with high probability via solving the following convex relaxation formulation:

$$\min_{M,E} \|M\|_* + \lambda \|E\|_1, \text{ s.t. } X = M + E \qquad (1)$$

where X, M and E are the corrupted, low-rank and sparse matrices, respectively, and the nuclear norm $\|M\|_*$ is the sum of singular values of M. The $\ell_1$-norm of E, i.e., $\|E\|_1$ is the regularizer to handle sparse outliers, and $\lambda$ is the regularization parameter, which controls the relative weight between the nuclear norm and regularizer. However, the nuclear norm underestimates the nonzero singular values, especially large singular values that contain major information of a matrix. To alleviate this effect, the weighted nuclear norm is suggested, which is extended from the weighted $\ell_1$-norm for vectors, resulting in:

$$\min_{M,E} \|M\|_{\omega,*} + \lambda \|E\|_1, \text{ s.t. } X = M + E \qquad (2)$$

where the weighted nuclear-norm $\|M\|_{\omega,*} = \sum_{i=1}^r \omega_i \sigma_i = \|\sigma\|_{\omega,1}$ is the weighted $\ell_1$-norm of the vector of singular values. Nevertheless, compared with nonconvex penalties, the $\ell_1$-norm in (2), namely, $\|E\|_1$, is still vulnerable to large-magnitude outliers. In addition, it is known that nonconvex sparse regularization for low-rank matrices is able to reduce the bias for singular value estimates, thus the following double nonconvex penalty for low-rank and sparse components model is developed as:

$$\min_{M,E} \varphi_1(M) + \lambda \varphi_2(E), \text{ s.t. } X = M + E \qquad (3)$$

where $\varphi_1(\cdot)$ and $\varphi_2(\cdot)$ are nonconvex penalty functions.

(2) Proximity operator: For a proper and lower semi-continuous function $\varphi(\cdot)$, the Moreau envelope of the regularizer $\varphi(\cdot)$ multiplied by a scalar $\lambda > 0$ is defined as:

$$\min_x \frac{1}{2}(x-y)^2 + \lambda \varphi(x) \qquad (4)$$

whose solution is solved by the operator:

$$P_{\varphi(y)} := \arg\min_x \frac{1}{2}(x-y)^2 + \lambda \varphi(x) \qquad (5)$$

which is called the proximity operation of $\varphi(\cdot)$. In fact, the proximity operator has been extensively used in signal denoising, image restoration and sparse representation. When $\varphi(\cdot)$ is convex, (4) is strictly convex and has the optimal solution. While when $\varphi(\cdot)$ is nonconvex, (4) is generally a nonconvex problem. Recent studies show that the solution to (4) can be attained even when $\varphi(\cdot)$ is nonconvex, but it requires iterations, that is, the explicit proximity operator cannot be found. In addition, one related work generates a series of nonconvex IRs to achieve robustness using a half-quadratic optimization, but their resultant IRs are not sparsity-inducing regularizers, which limits their application. The common sparsity-promoting regularizer is the $\ell_1$-norm, and its proximity operator can be found in (10) which will be discussed below. However, as afore-mentioned, it suffers a bias problem.

It is one of the purposes of the present invention to address the problem of restoring a matrix with low-rank constraint in the presence of sparse outliers. Nonconvex regularizers may not have the closed-form proximity operators, thus iterations are needed to find their expressions, which increase a computational load. To address this issue, a framework in accordance with various embodiments is devised to generate sparsity-inducing regularizers with a closed-form proximity operator. Although the resultant regularizers may be nonconvex, their Moreau envelopes are convex.

The framework is then applied to three popular M-estimators, namely, Welsch, Cauchy and German-McClure functions, and their associated sparsity-inducing regularizers are first generated, which enrich the variety of regularizers. Next, a parameter selection strategy for the resultant regularizers is also proposed. Moreover, the regularizers are exploited for low-rank and sparse decomposition applications, leading to three algorithms based on the alternating direction method of multipliers with convergence guarantees. The property that any limit point generated is a critical point is proven as well. Finally, extensive numerical experiments based on synthetic and real-world data are conducted to demonstrate the validity of the developed approaches.

Firstly, the framework for sparsity inducing regularizer generation is discussed. FIG. 1 illustrates the curves of Huber and truncated-quadratic functions. The definition of Huber and truncated-quadratic functions are recalled.

Definition 1: The Huber function $l_h: \mathbb{R} \to \mathbb{R}$ is defined as:

$$l_h(x) = \begin{cases} x^2/2, & |x| \le \lambda \\ \lambda|x| - \frac{\lambda^2}{2}, & |x| > \lambda \end{cases} \qquad (6)$$

Definition 2: The truncated-quadratic function $l_t: \mathbb{R} \to \mathbb{R}$ is defined as:

$$l_t(x) = \begin{cases} x^2/2, & |x| \le \lambda \\ \frac{\lambda^2}{2}, & |x| > \lambda \end{cases} \qquad (7)$$

The curves of $l_h$ and $l_t$ are shown in FIG. 1. Besides, both can be written via a half-quadratic optimization or Legendre-Ferchel transform as:

$$l(x) = \min_y \frac{1}{2}(x-y)^2 + \lambda\varphi(y) \tag{8}$$

where $\varphi(y) = \varphi_h(y) = |y|$ for the Huber function, while for the truncated-quadratic function:

$$\varphi(y) = \varphi_t(y) = \begin{cases} -\frac{(|y|-\lambda)^2}{2\lambda} + \frac{\lambda}{2}, & |y| < \lambda \\ \frac{\lambda}{2}, & |y| \geq \lambda \end{cases} \tag{9}$$

The solutions to (8) for $\varphi_h(y)$ and $\varphi_t(y)$, known as proximity operator, are:

$$P_{\varphi h,\lambda}(x) = \max\{0, |x|-\lambda\} \cdot \text{sign}(x) \tag{10}$$

and $$P_{\varphi t,\lambda}(x) = \begin{cases} 0, & |x| < \lambda \\ \{0, x\}, & |x| = \lambda \\ x, & |x| > \lambda \end{cases} \tag{11}$$

respectively, implying that $\varphi_h(y)$ and $\varphi_t(y)$ are sparsity-inducing regularizers. It is worth noting that the proximity operator for the $\ell_0$-norm is the same as (11).

In the present invention, a framework is provided to generate different sparsity-inducing regularizers via generalizing (6) and (7) for $|x| > \lambda$ as illustrated in FIG. 1. In various embodiments, the provided loss function has the form of:

$$l_{g,\lambda}(x) = \begin{cases} x^2/2, & |x| \leq \lambda \\ a \cdot g(|x|) + b, & |x| > \lambda \end{cases} \tag{12}$$

where $g(x)$ is a continuous function and $g'(x) \geq 0$ for $x > 0$, while $a$ and $b$ are constants to make $l(x)$ continuously differentiable at $x = \lambda$. Thus, $a = \lambda/g'(\lambda) > 0$ ($g'(\lambda) \neq 0$), and $b = \lambda^2/2 - ag(\lambda)$. It is easy to see that (6) and (7) are a special case of (12).

Theorem 1. Define $$h(x) = \frac{x^2}{2} - a \cdot g(|x|) - b.$$

If $h'(x) > 0$ and $h''(x) > 0$ for $x > \lambda$, namely, $h(x)$ is strictly convex when $x > \lambda$, then (12) can be used to generate sparsity-inducing regularizers.

Proof: It is proven that this function can generate sparse regularizers via the Legendre-Fenchel transform. Given a function $f(x)$, its conjugate $f^*(y)$ is:

$$f^*(y) = \sup_x x \cdot y - f(x) \tag{13}$$

and if $f(x)$ is convex, the conjugate of $f^*(x)$ is $f(x)$, namely, $$f(x) = (f^*(x))^* = \max_y x \cdot y - f^*(y) \tag{14}$$

Note that when $f(x)$ is convex, the sup is the max. Since $h(x)$ is strictly convex, a convex function $f(x)$ can be defined as:

$$f(x) = \frac{x^2}{2} - l_{g,\lambda}(x) = \begin{cases} 0, & |x| \leq \lambda \\ \frac{x^2}{2} - a \cdot g(|x|) - b, & |x| > \lambda \end{cases} \tag{15}$$

Thus, $$f^*(y) = \max_x x \cdot y - \frac{x^2}{2} + l_{g,\lambda}(x) \tag{16}$$

$$= \max_x -\frac{(y-x)^2}{2} + l_{g,\lambda}(x) + \frac{y^2}{2}$$

$$= \lambda\varphi_{g,\lambda}(y) + \frac{y^2}{2}$$

where $$\varphi_{g,\lambda}(y) = \max_x -\frac{(y-x)^2}{2\lambda} + \frac{l_{g,\lambda}(x)}{\lambda} \tag{17}$$

Since $f(x)$ is convex, it is obtained that:

$$f(x) = (f^*(x))^* = \max_y y \cdot x - f^*(y) \tag{18}$$

$$= \max_y y \cdot x - \lambda\varphi_{g,\lambda}(y) - \frac{y^2}{2}$$

$$= \max_y -\frac{(y-x)^2}{2} - \lambda\varphi_{g,\lambda}(y) + \frac{x^2}{2}$$

Combining (15) and (18), it is easy to obtain:

$$l_{g,\lambda}(x) = \min_y \frac{(x-y)^2}{2} + \lambda\varphi_{g,\lambda}(y) \tag{19}$$

Similar to the regularizers in the related works, the expression of $\varphi(y)$ is generally unknown, which is referred to as implicit regularizer (IR). Before solving (19), the following lemma is introduced.

Lemma 1. (Inversion rule for subgradient relations) For any proper, lower semicontinuous and convex function $f(x)$, there are:

$$\arg\max_y y \cdot x - f^*(y) = \partial f(x) \tag{20}$$

$$\arg\max_x x \cdot y - f(x) = \partial f^*(y)$$

Since the solution to (19) is the same as that to (18), according to Lemma 1, the solution to $y$ •in (19) is:

$$P\varphi_{g,\lambda}(x) := y = \nabla f(x) = \max\{0, |x| - a \cdot g'(|x|)\} \cdot \text{sign}(x) \tag{21}$$

which means that the IR generated by $l_{g,\lambda}(x)$ can make the solution sparse, and $P\varphi_{g,\lambda}(x)$ is nondecreasing since h(x) is strictly convex for $|x|>\lambda$.

Figure 2:
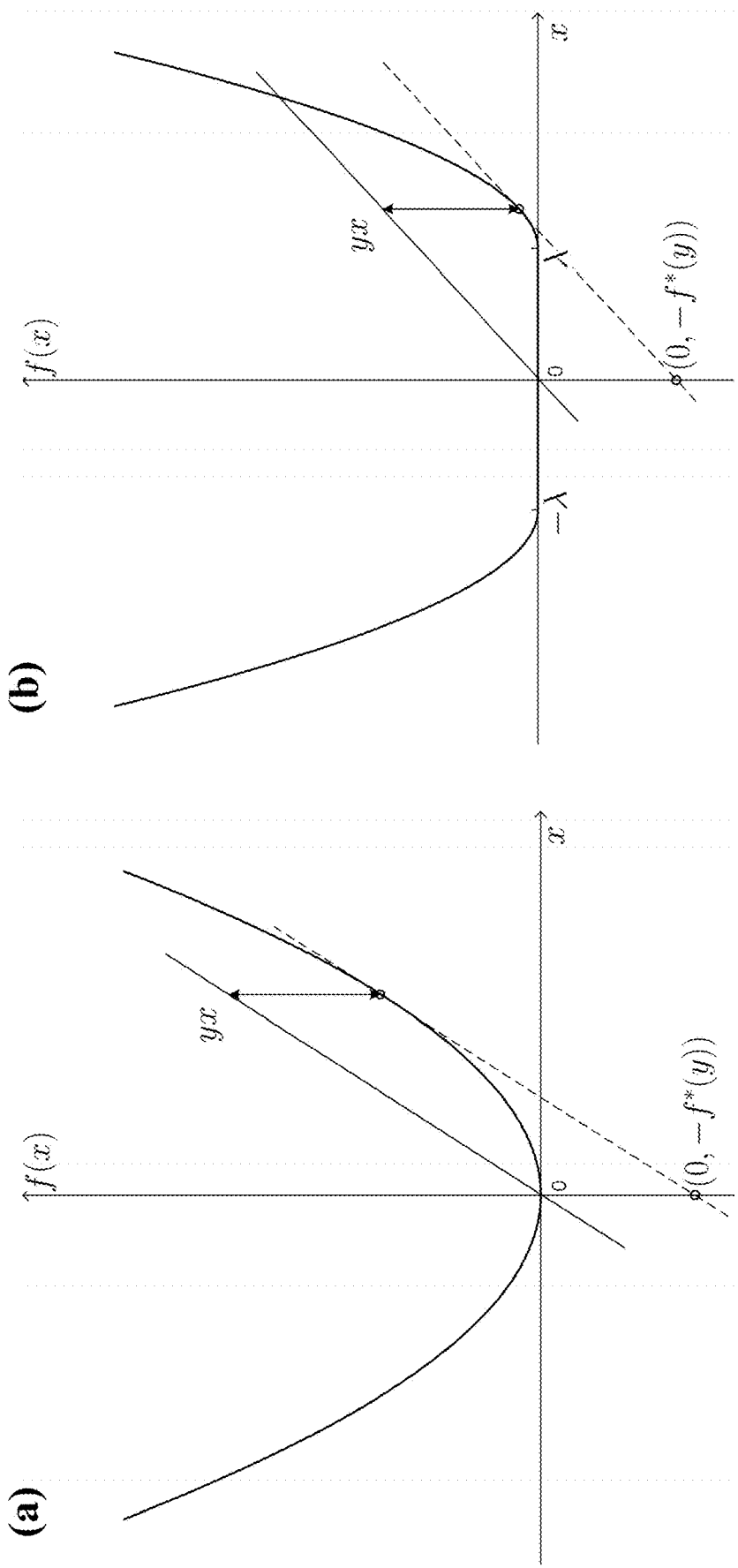
FIG. 2 illustrates a convex function $f(x)$ and its conjugate function $f^*(y)$ at y which is the maximum gap between yx and $f(x)$ where $y=\nabla f(x)$, including sections (a) and (b)

FIG. 2 illustrates the convex function $f(x)$ and its conjugate function $f^*(y)$ at y which is the maximum gap between yx and $f(x)$ where $y=\nabla f(x)$, in which the section (a) is an arbitrary convex function while; and the section (b) is the convex function generated by (12).

Next, the reason of sparsity-promoting regularizer generation is illustrated via (12), compared with other convex functions in FIG. 2. It is observed that $y=\nabla f(x)$ is not zero, except for x=0 in FIG. 2 (a), while for our convex function in FIG. 2 (b), $y=\nabla f(x)=0$ with $|x|\leq\lambda$, and when $|x|>\lambda$, $y=\nabla f(x)$ is not equal to zero and is unique because $f(x)$ is convex. In addition, the following proposition describes the properties of the IR, i.e., $\varphi_{g,\lambda}(y)$, in (19), whose proof is found in Appendix B.

Proposition 1. Although $\varphi_{g,\lambda}(y)$ may be nonconvex, the problem (19) is convex, and $\varphi_{g,\lambda}(y)$ has the following properties:

1) $\varphi_{g,\lambda}(y)$ is symmetric, i.e., $\varphi_{g,\lambda}(y)=\varphi_{g,\lambda}(-y)$.
2) $\varphi_{g,\lambda}(y)$ is continuous, but unsmooth at y=0.
3) $\varphi_{g,\lambda}(y)$ is nonnegative and increasing when y>0.
4) If g(x) is concave for $x>\lambda$, $\varphi(y)$ is concave and satisfies the triangle inequality, i.e., $\varphi_{g,\lambda}(y_1+y_2)\leq\varphi_{g,\lambda}(y_1)+\varphi_{g,\lambda}(y_2)$ for any $y_1, y_2\in\mathbb{R}$.

Second, generalization via g(x) is discussed. It is worth mentioning that g(x) can represent many convex or nonconvex functions. In various embodiments, a nonconvex g(x), and exploit g(x) for three M-estimators, namely, Welsch, Cauchy, and German-McClure are considered, resulting in three different sparsity-inducing regularizers. Compared with the case g(x) as convex or concave functions for x>0, it is difficult to analyze those M-estimators because they are nonconvex and nonconcave.

Regarding modification to the Welsch Function, the Welsch function is a M-estimator, whose expression is:

$$\rho_{wels}(x) = \frac{\sigma^2}{2}\left(1 - e^{-\frac{x^2}{\sigma^2}}\right) \quad (22)$$

It is because minimizing (12) has been shown to be equivalent to maximizing the correntropy criterion when the Gaussian kernel is adopted as a correntropy function with $\sigma$ being the kernel parameter. Thus, the provided theory of the present invention is applied to the Welsch function. When $g(x)=\rho_{wel}(x)$, according to (12), the hybrid Welsch function is:

$$l_{\sigma,\lambda}(x) = \begin{cases} \frac{x^2}{2} & |x| \leq \lambda \\ \frac{\sigma^2}{2}\left(1 - e^{-\frac{\lambda^2-x^2}{\sigma^2}}\right) + \frac{\lambda^2}{2} & |x| > \lambda \end{cases} \quad (23)$$

which can be rewritten via (19) as:

$$l_{\sigma,\lambda}(x) = \min_y \frac{(x-y)^2}{2} + \lambda\varphi_{\sigma,\lambda}(y) \quad (24)$$

The solution is:

$$P\varphi_{\sigma,\lambda}(x) := \max\left\{0, |x| - |x|\cdot e^{\frac{(\lambda^2-x^2)}{\sigma^2}}\right\}\cdot\text{sign}(x) \quad (25)$$

Regarding modification to the Cauchy Function, unlike the Welsch M-estimator, which is bounded from above, the Cauchy function is unbounded from above, whose expression is:

$$\rho_{cauchy}(x) = \frac{\gamma^2}{2}\ln\left(1 + \left(\frac{x}{\gamma}\right)^2\right) \quad (26)$$

where $\gamma$ is the scale parameter of the Cauchy distribution. Thus, when $g(x)=\rho_{cauch}(x)$, the hybrid Cauchy function can be obtained as:

$$l_{\gamma,\lambda}(x) = \begin{cases} \frac{x^2}{2} & |x| \leq \lambda \\ \frac{\gamma^2+\lambda^2}{2}\ln\left(1 + \left(\frac{x}{\gamma}\right)^2\right) + \delta & |x| > \lambda \end{cases} \quad (27)$$

where $$\delta = \frac{\lambda^2}{2} - \frac{\gamma^2+\lambda^2}{2}\ln\left(1 + \left(\frac{\lambda}{\gamma}\right)^2\right).$$

In addition, there is:

$$l_{\gamma,\lambda}(x) = \min_y \frac{(x-y)^2}{2} + \lambda\varphi_{\gamma,\lambda}(y) \quad (28)$$

and based on (21), its solution is:

$$P\varphi_{\gamma,\lambda}(x):=\max\left\{0, |x| - \frac{(y^2+\lambda^2)|x|}{y^2+x^2}\right\}\cdot\text{sign}(x) \quad (29)$$

Regarding modification to the German-McClure Function, the expression of German-McClure (GMC) M-estimator is:

$$\rho_{gmc}(x) = \frac{2(x/\tau)^2}{(x/\tau)^2 + 4} \quad (30)$$

where $\tau>0$ is a scale parameter. Thus, when $g(x)=\rho_{gmc}(x)$, there is:

$$l_{\tau,\lambda}(x) = \begin{cases} x^2/2 & |x| \leq \lambda \\ \frac{(\lambda^2+4\tau^2)^2 x^2}{8\tau^2(x^2+4\tau^2)} - \frac{\lambda^4}{8\tau^2} & |x| > \lambda \end{cases} \quad (31)$$

which amounts to:

$$l_{\tau,\lambda}(x) = \min_y \frac{(x-y)^2}{2} + \lambda\varphi_{\tau,\lambda}(y) \quad (32)$$

where $\varphi_{\tau,\lambda}(y)$ is the sparse regularizer related to $l_{\tau,\lambda}(x)$. Employing (21), the solution to (32) is:

$$P\varphi_{\tau,\lambda}(x) := \max\left\{0, |x| - \frac{(\lambda^2 + 4\tau^2)|x|}{(x^2 + 4\tau^2)^2}\right\} \cdot \text{sign}(x) \quad (33)$$

Figure 3:
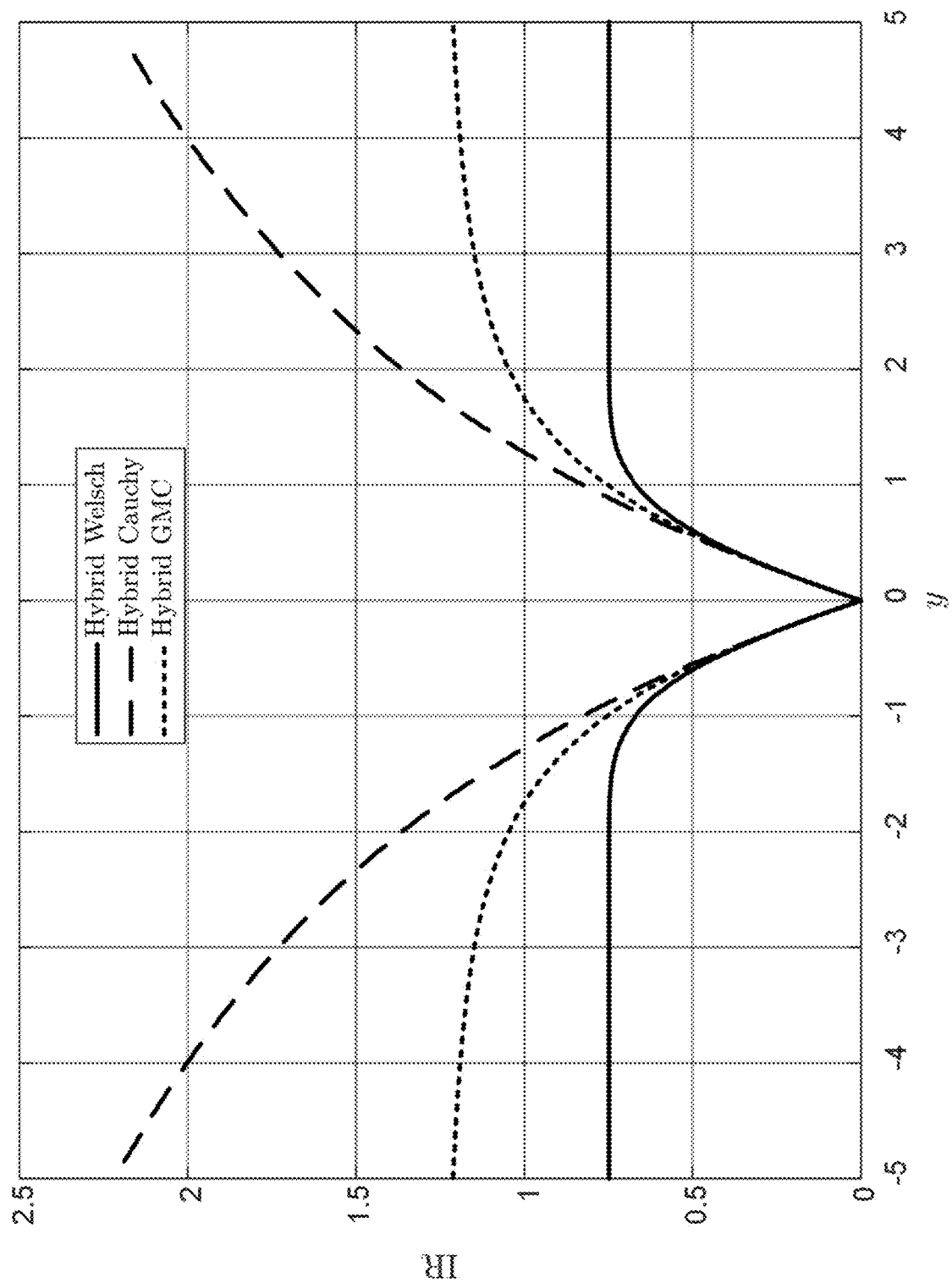
FIG. 3 plots the numerically-computed curves of $\varphi_{\sigma,\lambda}(y)$ $\varphi_{\gamma,\lambda}(y)$ and $\varphi_{\tau,\lambda}(y)$.

FIG. 3 illustrates the numerically-computed curves of $\varphi_{\sigma,\lambda}(y)$, $\varphi_{\gamma,\lambda}(y)$ and $\varphi_{\tau,\lambda}(y)$, in which their proximity operators are summarized in Table I. With respect to the illustration of FIG. 3, IRs of three hybrid loss functions are with $\lambda=0.5$, $\sigma=\sqrt{2}\lambda$, $\gamma=\lambda$ and $\tau=\sqrt{3}\lambda/2$ and when $y>0$, three IRs are concave.

TABLE I

Different loss functions and proximity operators for their sparsity-inducing regularizers.

| | Huber | Hybrid Welsch |
|---|---|---|
| l(x) | $\begin{cases} x^2/2, & |x| \le \lambda \\ \lambda|x| - \frac{\lambda^2}{2}, & |x| > \lambda \end{cases}$ | $\begin{cases} x^2/2, & |x| \le \lambda \\ \frac{\sigma^2}{2}\left(1 - e^{\frac{\lambda^2-x^2}{\sigma^2}}\right) + \frac{\lambda^2}{2}, & |x| > \lambda \end{cases}$ |
| P(x) | $\max\{0, [x] - \lambda\}\text{sign}(x)$ | $\max\left\{0, |x| - |x|e^{\frac{\lambda^2-x^2}{\sigma^2}}\right\}\text{sign}(x)$ |

| | Hybrid Cauchy | Hybrid GMC |
|---|---|---|
| l(x) | $\begin{cases} x^2/2, & |x| \le \lambda \\ \frac{\gamma^2+\lambda^2}{2}\ln\left(1+\frac{x^2}{\gamma^2}\right)+\delta, & |x| > \lambda \end{cases}$ | $\begin{cases} x^2/2, & |x| \le \lambda \\ \frac{(\lambda^2+4\tau^2)^2 x^2}{8\tau^2(x^2+4\tau^2)} - \frac{\lambda^4}{8\tau^2}, & |x| > \lambda \end{cases}$ |
| P(x) | $\max\left\{0, |x| - \frac{(\gamma^2+\lambda^2)|x|}{(\gamma^2+x^2)}\right\}\text{sign}(x)$ | $\max\left\{0, |x| - \frac{(\lambda^2+4\tau^2)^2|x|}{(x^2+4\tau^2)^2}\right\}\text{sign}(x)$ |

Figure 4:
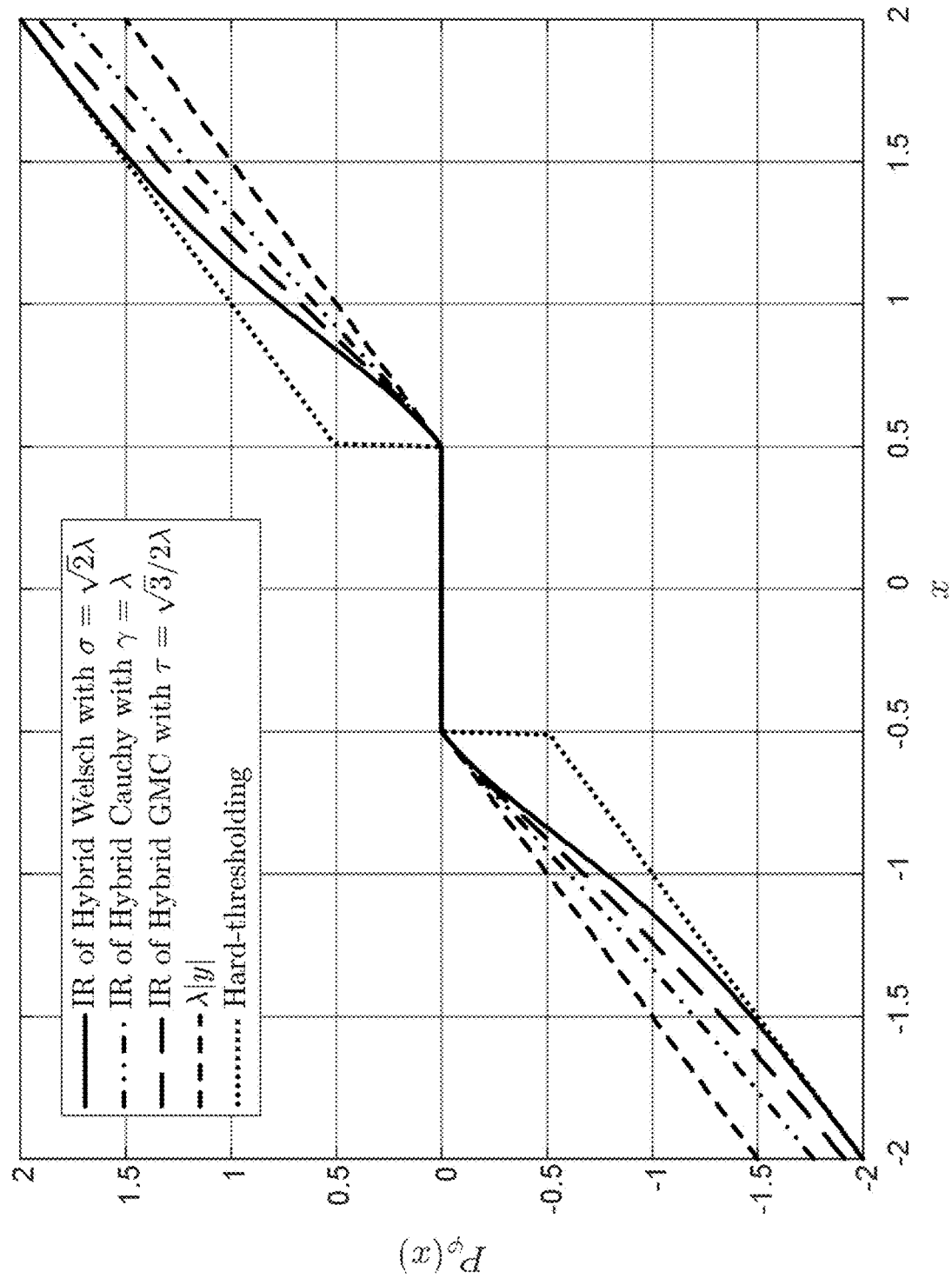
FIG. 4 illustrates the $P_\varphi(x)$ for different regularizers when $\lambda=0.5$ according to various embodiments of the present invention.

In various embodiments, a parameter selection strategy can be applied to the above modified functions. FIG. 4 illustrates $P_\varphi(x)$ for different regularizers when $\lambda=0.5$ according to various embodiments of the present invention.

There are four parameters for $l_{\sigma,\lambda}(x)$, $\varphi_{\gamma,\lambda}(y)$, $l_{\gamma,\lambda}(x)$, $\varphi_{\gamma,\lambda}(y)$, $l_{\tau,\lambda}(x)$ and $\varphi_{\tau,\lambda}(y)$, i.e., $\lambda$, $\sigma$, $\gamma$ and $\tau$. Apparently, knowing the physical meaning of a parameter can help choose parameters for their value. First, the Huber function $l_h(x)$ can be rewritten via (8) as:

$$l_h(x) = \min_y \frac{1}{2}(x-y)^2 + \lambda|y| \quad (34)$$

where $\lambda$ is a positive weighting parameter that controls sparsity, namely, $\gamma=0$ for $|x|\le\lambda$. Similarly, A for $\varphi_{\sigma,\lambda}(y)$, $\varphi_{\gamma,\lambda}(y)$ and $\varphi_{\tau,\lambda}(y)$ in (24), (28) and (32), respectively, also controls sparsity. That is, $\gamma=0$ for $|x|\le\lambda$. However, different from the Huber function that has the explicit $\lambda|y|$, the expressions of $\varphi_{\sigma,\lambda}(y)$, $\varphi_{\gamma,\lambda}(y)$ and $\varphi_{\tau,\lambda}(y)$ are generally unknown. Nevertheless, they all have a smaller bias than $\lambda|y|$, which is illustrated in FIG. 4, whose theoretical analysis can be found in Proposition 2.

Besides, the proximal operator for $\lambda|y|$ in (10) treats all values of x equally and shrinks x with the same bias/as indicated in (10). In fact, for many real-world applications, the bias for different x should not be the same. For example, when addressing low-rank matrix recovery, larger singular values of an observed matrix correspond to the dominant information, thus it is better to shrink them less.

Mathematically, the bias can be described via the difference between y=x and the proximal operator for different regularizers when $x>\lambda$:

$$\Delta d = x - (x - a \cdot g'(x)) = a \cdot g'(x) \quad (35)$$

and $\Delta d$ is required to be non-increasing as x increases, implying that $g''(x)\le 0$, namely, g(x) is concave when $x>\lambda$. For the hybrid Welsch function, when $x>\lambda$, $$g''(x) = \left(1 - \frac{2x^2}{\sigma^2}\right)e^{-\frac{x^2}{\sigma^2}} \le 0,$$

thus the obtained is $\sigma\le\sqrt{2}x$. Since $x>\lambda$, there is:

$$\sigma \le \sqrt{2}\lambda \quad (36)$$

Similarly, for $l_{\gamma,\lambda}(x)$, when $x>\lambda$, $$g''(x) = \frac{2(\gamma^2 - x^2)}{(\gamma^2 + x^2)^2} \le 0$$

and it is obtained that $\gamma\le x$. Thus for $l_{\gamma,\lambda}(x)$, there is:

$$\gamma \le \lambda \quad (37)$$

Finally, for the hybrid GMC function, $$g''(x) = \frac{16\tau^2(4\tau^2 - 3x^2)}{(x + 4\tau^2)^3} \le 0$$

is obtained to yield:

$$\tau \le \sqrt{3}\lambda/2 \quad (38)$$

The above is summarized in the following proposition.

Proposition 2. If with $\sigma\le\sqrt{2}\lambda$, $\gamma\le\lambda$ and $\tau\le\sqrt{3}\lambda/2$, $\varphi_{\sigma,\lambda}(y)$, $\varphi_{\gamma,\lambda}(y)$ and $\varphi_{\tau,\lambda}(y)$ have a smaller bias than $\varphi(y)=\lambda|y|$ when applied to the following problem:

$$\min_y \frac{(x-y)^2}{2} + \varphi(y) \quad (39)$$

Next, applications to low-rank matrix recovery are discussed, including mathematical preliminaries, algorithms for low-rank-plus-sparse matrix decomposition, and complexity.

Regarding mathematical preliminaries, the theory derived in the above is applied to the scalar case, and when it is extended to vectors, matrices, and the singular values of matrices, it is necessary to give the corresponding definitions. Besides, the proofs of the following propositions can be found in Appendices D, E and F, respectively.

Definition 3. Let $x \in \mathbb{R}^n$, $\varphi_{*,\lambda}(x): \mathbb{R}^n \to \mathbb{R}$ is defined as:

$$\varphi_{*,\lambda}(x) = \sum_{i=1}^{n} \varphi_{*,\lambda}(x_i) \qquad (40)$$

where $\varphi_{*,\lambda}(\cdot)$ can be $\varphi_{\sigma,\lambda}(\cdot)$, $\varphi_{\gamma,\lambda}(\cdot)$ and $\varphi_{\tau,\lambda}(\cdot)$, and $\sigma$, $\gamma$ and $\tau$ are positive constants.

Proposition 3. Given the vector operator defined in (40), its proximity operator $P_{\varphi*,\lambda}(\cdot): \mathbb{R}^n \to \mathbb{R}^n$ is defined as:

$$P_{\varphi,\lambda}(x) := \arg\min_y \frac{1}{2}\|x-y\|_2^2 + \lambda_{\varphi,\lambda}(y) \qquad (41)$$

whose solution is:

$$P_{\varphi,\lambda}(x) = \max\{0, |x| - a \cdot g'(|x|)\} \cdot \text{sign}(x) \qquad (42)$$

where $P_{\varphi*,\lambda}(\cdot)$ is an element-wise operator. That is, $P_{\varphi*,\lambda}(x) = [P_{\varphi*,\lambda}(x_1) P_{\varphi*,\lambda}(x_2) \ldots P_{\varphi*,\lambda}(x_n)]$. In this invention, $P_{\varphi*,\lambda}(\cdot)$ can be $P_{\varphi\sigma,\lambda}(\cdot)$, $P_{\varphi\gamma,\lambda}(\cdot)$ and $P_{\varphi\tau,\lambda}(\cdot)$. In addition, when $\sigma \leq \sqrt{2}\lambda$, $\gamma \leq \lambda$ and $\tau \leq \sqrt{3}\lambda/2$, the obtained is:

$$\|x - P_{\varphi*,\lambda}(x)\|_2 \leq \sqrt{n}\lambda \qquad (43)$$

Definition 4. Let $X \in \mathbb{R}^{m \times n}$, $\varphi_{*,\lambda}(X): \mathbb{R}^{m \times n} \to \mathbb{R}$ is defined as:

$$\varphi_{*,\lambda}(X) = \sum_{i=1}^{m} \sum_{j=1}^{n} \varphi_{*,\lambda}(X_{i,j}) \qquad (44)$$

where $\varphi_{*,\lambda}(\cdot)$ can be $\varphi_{\sigma,\lambda}(\cdot)$, $\varphi_{\gamma,\lambda}(\cdot)$ and $\varphi_{\tau,\lambda}(\cdot)$, while $\sigma$, $\gamma$ and $\tau$ are positive constants.

Proposition 4. Given the matrix operator defined in (44), its proximity operator $P_{\varphi*,\lambda}(\cdot): \mathbb{R}^{m \times n} \to \mathbb{R}^{m \times n}$ is defined as:

$$P_{\varphi,\lambda}(X) := \arg\min_Y \frac{1}{2}\|X-Y\|_2^2 + \lambda_{\varphi,\lambda}(Y) \qquad (45)$$

whose solution is:

$$P_{\varphi,\lambda}(X) = \max\{0, |X| - a \cdot g'(|X|)\} \cdot \text{sign}(X) \qquad (46)$$

where $P_{\varphi*,\lambda}(\cdot)$ is an element-wise operator, and $P_{\varphi*,\lambda}(\cdot)$ can be $P_{\varphi\sigma,\lambda}(\cdot)$, $P_{\varphi\gamma,\lambda}(\cdot)$ as well as $P_{\varphi\tau,\lambda}(\cdot)$. Besides, when $\sigma \leq \sqrt{2}\lambda$, $\gamma \leq \lambda$ and $\tau \leq \sqrt{3}\lambda/2$, the obtained is:

$$\|X - P_{\varphi,\lambda}(X)\|_F \leq \sqrt{mn}\lambda \qquad (47)$$

Definition 5. Let $X = U \text{Diag}(s) V^T$ be the SVD of a rank-r matrix $X \in \mathbb{R}^{m \times n}$, where $s = [s_1, s_2, \ldots, s_r]^T$ is the vector of singular values. The nuclear norm $\|X\|_*$ is defined as:

$$\|X\|_* = \|s\|_1 = \sum_{i=1}^{r} s_i \qquad (48)$$

which is the $\ell_1$-norm of s.

However, employing the nuclear norm to achieve low-rank recovery will lead to a biased solution because the nuclear norm is based on the $\ell_1$-norm of singular values. To address this issue, the non-convex regularizers $\varphi(\cdot)$ of the present invention are used to replace the $\ell_1$-norm. Compared with other nonconvex regularizers, ours have closed-form proximity operators.

Definition 6. Let $X = U \text{Diag}(s) V^T$ be the SVD of a rank-r matrix $X \in \mathbb{R}^{m \times n}$, where $s = [s_1, s_2, \ldots, s_r]^T$ is the vector of singular values. The matrix $\varphi*,\lambda$-norm of X, denoted as $\|X\|_{\varphi*,\lambda}$, is defined as:

$$\|X\|_{\varphi*,\lambda} = \varphi*,\lambda(s) = \sum_{i=1}^{r} \varphi*,\lambda(s_i) \qquad (49)$$

Lemma 2. Let $X = U \text{Diag}(s) V^T$ be the SVD of a rank-r matrix $X \in \mathbb{R}^{m \times n}$ where $s = [s_1, s_2, \ldots, s_r]^T$ is the vector of singular values, and define:

$$P_{\|\cdot\|_{\varphi*,\lambda}}(X) = \arg\min_M \lambda\|M\|_{\varphi*,\lambda} + \frac{1}{2}\|X - M\|_F^2 \qquad (50)$$

If the proximity operator $P_{\varphi*,\lambda}$ is monotone, then the solution for (50) is:

$$M = U \text{Diag}(s^*) V^T$$

where $s^*$ satisfies $s_1^* \geq \ldots \geq s_i^* \geq \ldots \geq s_r^*$ with $i = 1, 2, \ldots, r$, which is determined as:

$$s_i^* \in P_{\varphi,\lambda}(s_i) = \arg\min_{s>0} \lambda_{\varphi,\lambda}(s) + \frac{1}{2}(s - s_i)^2$$

Proposition 5. For the solution to (50), when $\sigma \leq \sqrt{2}\lambda$, $\gamma \leq \lambda$ with $\lambda = 0.5$ and $\tau \leq \sqrt{3}\lambda/2$ there is:

$$\|X - P_{\|\cdot\|_{\varphi*,\lambda}}(X)\|_F \leq \sqrt{r}\lambda \qquad (51)$$

Regarding algorithms for low-rank-plus-sparse matrix decomposition, the regularizers of the present invention are applied to RPCA via decomposing the target matrix into a sum of low-rank and sparse matrices, which is formulated as:

$$\min_{M,E} \|M\|_{\varphi*,1/\rho} + \lambda_{\varphi,\lambda/\rho}(E) \text{ s.t. } X = M + E \qquad (52)$$

where $\varphi\cdot, 1/p(\cdot)$ and $\varphi\cdot, \lambda/p(\cdot)$ are the regularizers included in TABLE II.

TABLE II

Choice of different sparsity-inducing regularizers.

| Algorithm | Hybrid Welsch SIR-HW | Hybrid Cauchy SIR-HC | Hybrid GMC SIR-HG |
|---|---|---|---|
| $\varphi\cdot, 1/\rho(\cdot)$ | $\varphi_\sigma, 1/\rho(\cdot)$ | $\varphi_\gamma, 1/\rho(\cdot)$ | $\varphi_\tau, 1/\rho(\cdot)$ |
| $\varphi\cdot, \lambda/\rho(\cdot)$ | $\varphi_\sigma, \lambda/\rho(\cdot)$ | $\varphi_\gamma, \lambda/\rho(\cdot)$ | $\varphi_\tau, \lambda/\rho(\cdot)$ |

The problem (52) can be solved by ADMM, and its augmented Lagrangian is:

$$\mathcal{L}'_\rho(M, E, \Lambda) = \tag{53}$$

$$\|M\|_{\varphi\cdot, 1/\rho} + \lambda_{\varphi\cdot, \lambda/\rho}(E) + \langle \Lambda, X - M - E \rangle + \frac{\rho}{2}\|X - M - E\|_F^2$$

which amounts to:

$$\mathcal{L}_\rho(M, E, \Lambda) = \tag{54}$$

$$1/\rho\|M\|_{\varphi\cdot, 1/\rho} + \lambda/\rho \times_{\varphi\cdot, \lambda/\rho}(E) + \langle \Lambda, X - M - E \rangle/\rho + \frac{1}{2}\|X - M - E\|_F^2$$

where $\Lambda$ contains the Lagrange multipliers, the last term is the augmented term and $\rho > 0$ is the augmented Lagrangian parameter. The ADMM updates the primal and dual variables at (k+1)-th iteration via:

$$E^{k+1} = \arg\min_E \mathcal{L}\left(M^k, E, \Lambda^k\right) \tag{55}$$

$$M^{k+1} = \arg\min_M \mathcal{L}\left(M, E^{k+1}, \Lambda^k\right)$$

$$\Lambda^{k+1} = \Lambda^k + \rho^k\left(X - M^{k+1} - E^{k+1}\right)$$

The exact expressions at the (k+1)th iteration, i.e., $\{M^{k+1}, E^{k+1}, \Lambda^{k+1}\}$, are derived as follows.

Update of E: E is updated via:

$$\arg\min_E \lambda/\rho^k \varphi\cdot, \lambda/\rho^k(E) + \frac{1}{2}\left\|X - M^k + \frac{\Lambda^k}{\rho^k} - E\right\|_F^2 \tag{56}$$

where the constant term is ignored since it does not affect the solution to $E^{k+1}$. Invoking (21), there is:

$$E^{k+1} = P_{\varphi\cdot, \lambda/\rho^k}\left(X - M^k + \frac{\Lambda^k}{\rho^k}\right) \tag{57}$$

Update of M: Given $E^{k+1}$ and $\Lambda^k$, the low-rank matrix M is updated via:

$$\arg\min_M 1/\rho^k\|M\|_{\varphi\cdot, 1/\rho^k} + \frac{1}{2}\left\|X - E^{k+1} + \frac{\Lambda^k}{\rho^k} - M\right\|_F^2 \tag{58}$$

According to Lemma 2, the solution is:

$$M^{k+1} = P_{\|\cdot\|_{\varphi\cdot, 1/\rho^k}}\left(X - E^{k+1} + \frac{\Lambda^k}{\rho^k}\right) \tag{59}$$

FIG. 5 illustrates Algorithm 1 which describes the preceding optimization steps according to various embodiments of the present invention. The preceding optimization steps are described in Algorithm 1, whose convergence is analyzed in Theorem 2. In addition, it is worth mentioning that Algorithm 1 gives a framework to generate the low-rank and sparse components attained by different sparsity-inducing regularizers found in Table II. Although there would be nine algorithms obtained by various combinations of $\varphi\cdot, 1/\rho(\cdot)$ and $\varphi\cdot, \lambda/\rho(\cdot)$ as shown in Table II, there are cases where $\varphi\cdot, 1/\rho(\cdot)$ and $\varphi\cdot, \lambda/\rho(\cdot)$ are generated from the same loss function, resulting in three different algorithms. For example, when $\varphi\cdot, 1/\rho(\cdot)$ and $\varphi\cdot, \lambda/\rho(\cdot)$ are generated from the hybrid Welsch function, i.e., $\varphi\cdot, 1/\rho(\cdot) = \varphi_\sigma, 1/\rho(\cdot)$ and $\varphi\cdot, \lambda/\rho(\cdot) = \varphi_\sigma, \lambda/\rho(\cdot)$, the resulting algorithm is referred to as SIR-HW. The abbreviations of the remaining algorithms can be found in Table II. In addition, the sparse regularizers generated by the Huber and truncated-quadratic functions are employed to obtain low-rank and sparse decomposition, leading to two ADMM based algorithms, referred to as SIR-HU and SIR-HT, respectively.

Theorem 2. The $\{M^k, E^k\}$ generated by the proposed algorithm satisfy the following properties:

$$\lim_{k\to\infty} \|M^{k+1} - M^k\|_F^2 = 0 \qquad 1).$$

$$\lim_{k\to\infty} \|E^{k+1} - E^k\|_F^2 = 0 \qquad 2).$$

$$\lim_{k\to\infty} \|X - M^{k+1} - E^{k+1}\|_F^2 = 0 \qquad 3).$$

Let $\{M^{kj}, E^{kj}, \Lambda^{kj}\}$ be a subsequence of $\{M^k, E^k, \Lambda^k\}$ generated by the proposed algorithm such that $\lim_{kj\to\infty}\{M^{kj}, E^{kj}, \Lambda^{kj}\} = \{M^*, E^*, \Lambda^*\}$. Then, $\{M^*, E^*, \Lambda^*\}$ is a critical point.

Regarding complexity, similar to PCP and WNNM-RPCA, when finding the low-rank matrix, the proposed algorithms involve the computation of an SVD per iteration, whose complexity is O(min(m, n)mn), where m and n are the row and column lengths of the degraded matrix, respectively. In addition, the complexity of calculating the sparse matrix is O(mn). Therefore, solving the low-rank component dominates the computational time at each iteration.

In order to verify an image restoration processor of the present invention, extensive experiments on both synthetic and real-life data are conducted. In experimental results, SIR-HW, SIR-HC and SIR-HG, together with SIR-HU and SIR-HT, are assessed. Parameter settings for $\sigma=\sqrt{2}\lambda$, $\gamma=\lambda$ and $\tau=\sqrt{3}\lambda/2$ are suggested. In addition, three benchmark techniques, namely, PCP, WNNM-RPCA, and DPRPCA are employed. The experimental results include two parts, (1) synthetic data and (2) real-world image restoration.

Regarding synthetic data, the data matrix $X \in \mathbb{R}^{m \times n}$ is generated by a sum of low-rank matrix $M = UV^T$, where $U \in \mathbb{R}^{m \times r}$ and $V \in \mathbb{R}^{n \times r}$ with r being the rank, and sparse matrix E. n=m is set for convenience. The entries of U and V satisfy the standard Gaussian distribution, and the locations of the sparse outliers E, which has S non-zero entries uniformly distributed in [−500, 500], are drawn independently from a Bernoulli distribution. Similar to some related works, $r = p_r \times m$ and $S = p_s \times m^2$. In the experiments, m=400 is set, and $p_r$ and $p_s$ vary from 0.01 and 0.05 with a step size of 0.02.

Besides, two evaluation metrics are employed, namely, relative reconstruction error of the low-rank matrix REE=$\|M-\hat{M}\|_F^2/\|M\|_F^2$, where $\hat{M}$ is the estimated low-rank matrix, and the estimated rank $\hat{r}$. All the competing methods, including PCP and WNNM-RPCA, are set with the same parameters and stopping conditions. That is, $\lambda=1/\sqrt{\max(m,n)}$ and $\mu=1.05$, while $\|X-M^k-E^k\|_F/\|X\|_F<10^{-7}$ and the maximum iteration number of 1000 as termination conditions for all algorithms. Moreover, the performance of all approaches is evaluated using the average results of 100 independent runs.

Figure 6:
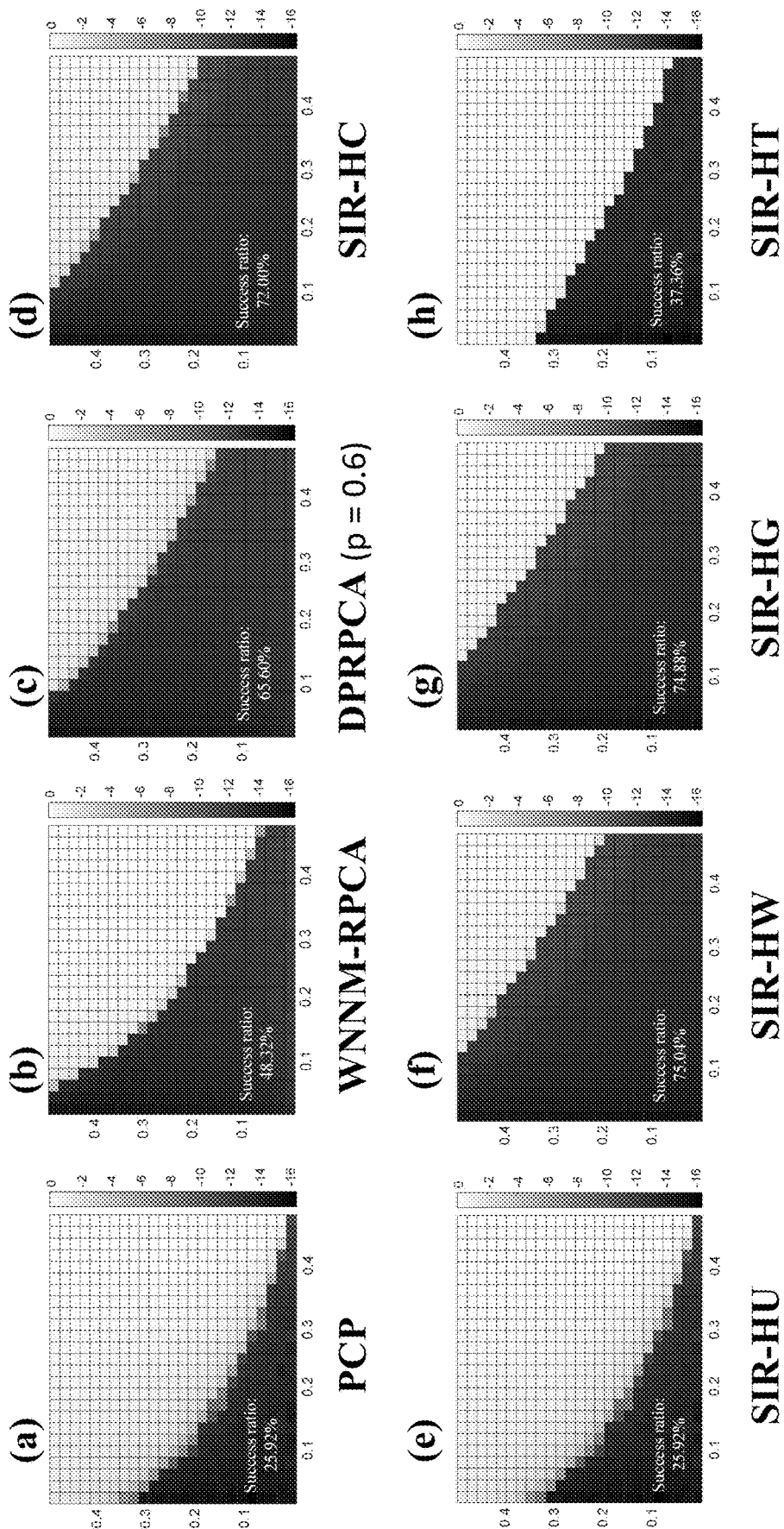
FIG. 6 depicts the algorithm phase transition diagrams with different rank and outlier ratio settings of $\{p_r, p_s\}$ according to various embodiments of the present invention, including sections (a), (b), (c), (d), (e), (f), (g), and (h)

FIG. 6 depicts the algorithm phase transition diagrams with different ranks and outlier ratio settings of $\{p_r, p_s\}$ according to various embodiments of the present invention, in which sections (a), (b), (c), (d), (e), (f), (g), and (h) correspond to PCP, WNNM-RPCA, DPRPCA (p=0.6), SIR-HC, SIR-HU, SIR-HW, SIR-HG, and SIR-HT. The log-scale REE with various settings of $\{p_r, p_s\}$ is shown in FIG. 6. It can be seen that PCP and SIR-HU have the same phase transition diagram, because the regularizer generated by the Huber function is $\ell_1$-norm and PCP also employs the $\ell_1$-norm to achieve low-rank and sparse decomposition. Besides, compared with PCP, WNNM-RPCA and DPRPCA (p=0.6), SIR-HW, SIR-HC and SIR-HG can recover more cases, and among all the techniques, SIR-HG has the biggest success area (If REE<$10^{-4}$, it is denoted as a success recovery). TABLE III tabulates the average estimated rank by different algorithms. It is observed that SIR-HW and SIR-HG give more accurate rank estimates than the remaining methods for different rank parameters.

$p_r=0.1$ and $p_s=0.1$. It is observed that the relative errors approach zero with a sufficient number of iterations, which validates Theorem 2. Furthermore, the impact of $\lambda$ on the proposed algorithms is investigated in Appendix H.

Figure 8:
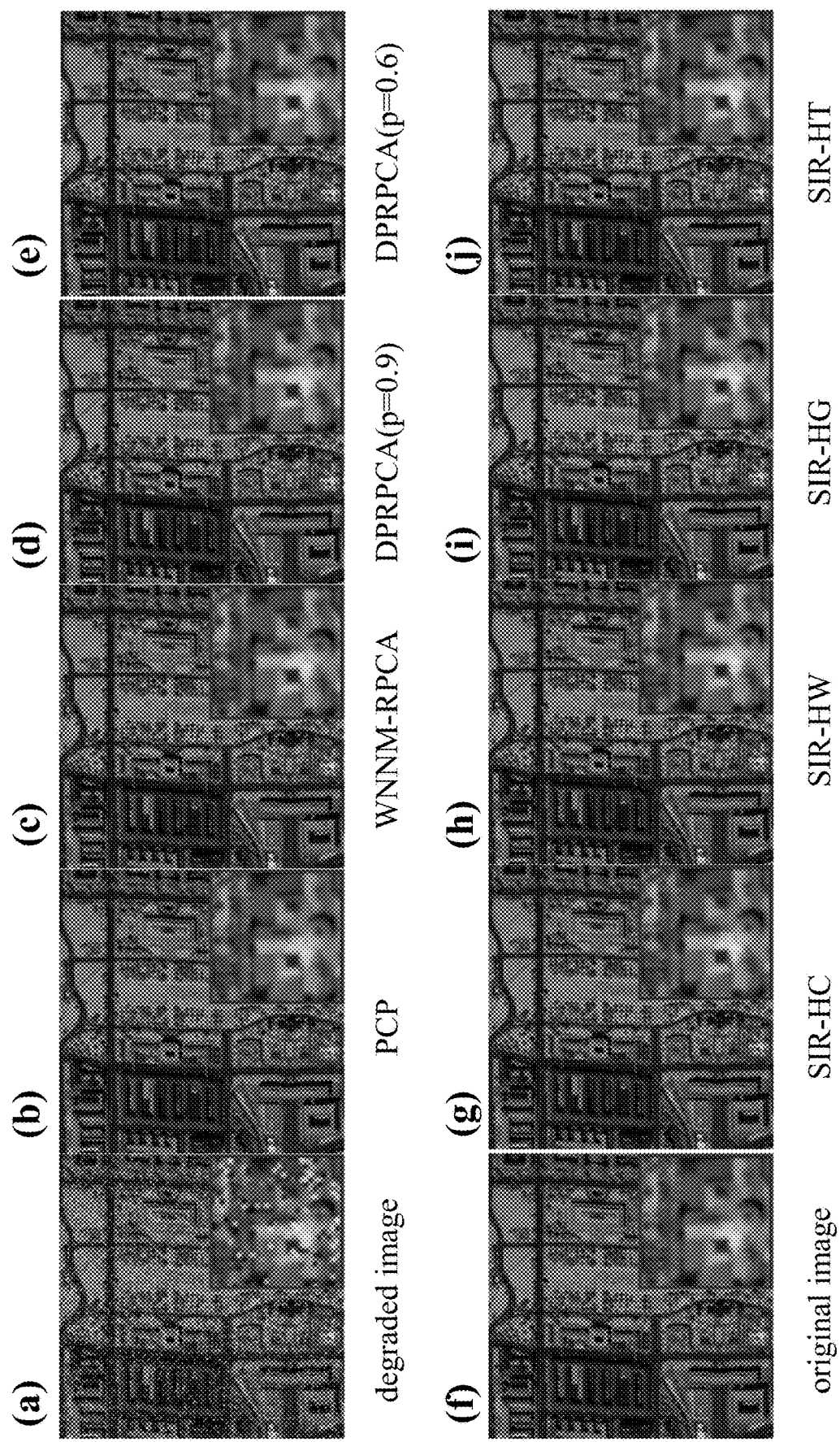
FIG. 8 depicts the recovered images of the Washington DC Mall with bands 126-73-12 as R-G-B, including sections (a), (b), (c), (d), (e), (f), (g), (h), (i), and (j)
Figure 9:
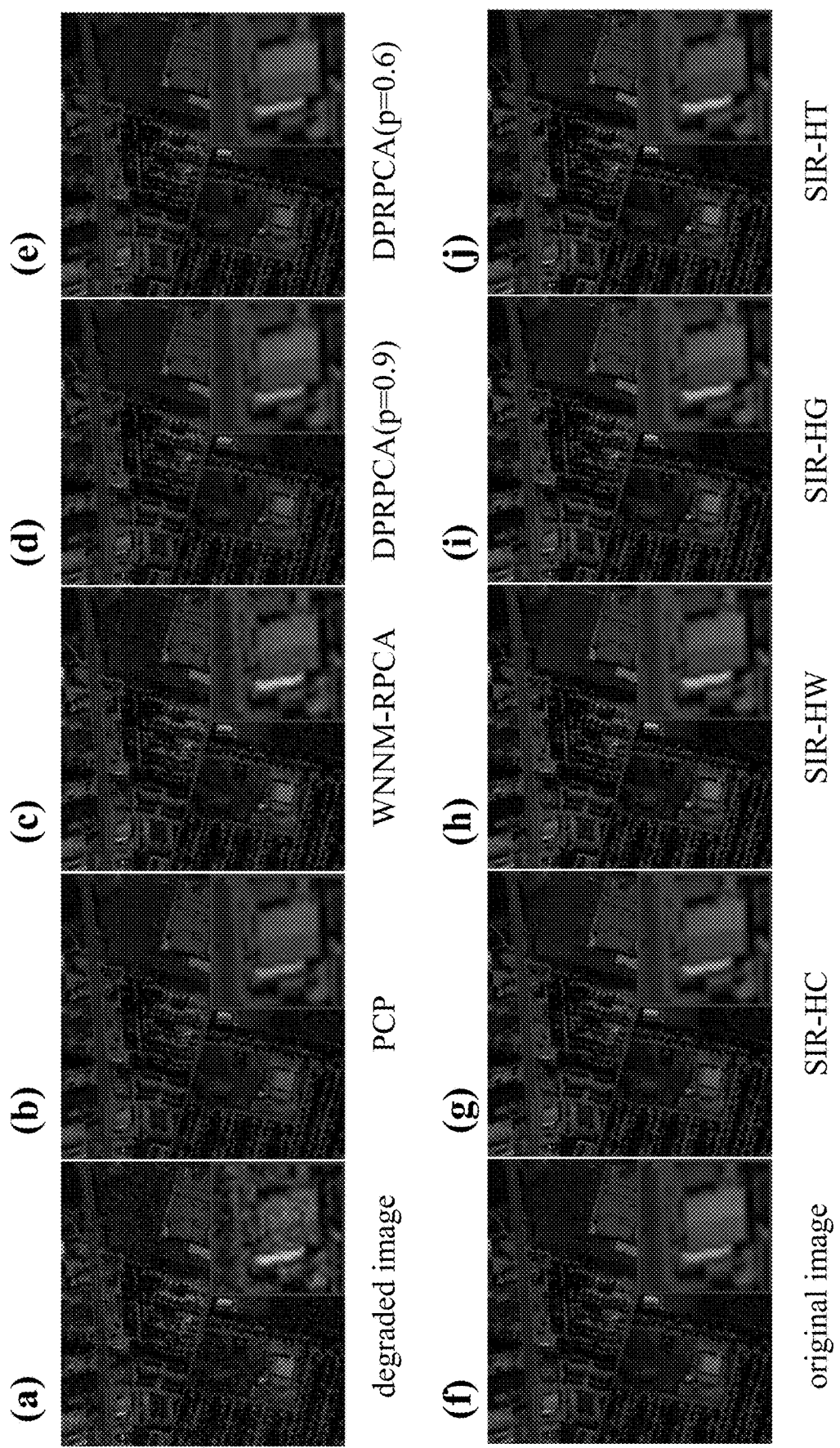
FIG. 9 depicts the recovered images of HYDICE urban data with bands 6-188-36 as R-G-B, including sections (a), (b), (c), (d), (e), (f), (g), (h), (i), and (j)

Regarding hyperspectral image restoration, FIG. 8 depicts recovered images of the Washington DC Mall with bands 126-73-12 as R-G-B, in which: the section (a) is the degraded image corrupted by 10 dB impulsive noise; the sections (b), (c), (d), (e) correspond to PCP, WNNM-RPCA, DPRPCA (p=0.9), DPRPCA (p=0.6); the section (f) is the original noise-free; and the sections (g), (h), (i), (j) correspond to SIR-HC, SIR-HW, SIR-HG, SIR-HT. These images are the restoration results by different algorithms, with a demarcated area zoomed in 4 times. FIG. 9 depicts the recovered images of HYDICE urban data with bands 6-188-36 as R-G-B, in which: the section (a) is the degraded image and the remaining images as the sections (b)-(j) are the restoration results by different algorithms, with a demarcated area zoomed in 4 times.

Hyperspectral imaging has numerous applications such as environmental monitoring, mineral exploration and urban planning. However, they may be contaminated by noise during the acquisition process. To restore hyperspectral images (HSIs), low-rank modeling has been found to be very useful because of the strong correlation along the spectral direction. The features as above are applied to HSI restoration. Three quantitative metrics, i.e., peak signal-to-noise ratio (PSNR), structure similarity index measure (SSIM) and root mean square error (RMSE), are employed. The PSNR, SSIM and RMSE of HSI data are calculated by:

TABLE III

| Average estimated rank by different methods with $p_s = 0.15$. | | | | | | | | | | | |
|---|---|---|---|---|---|---|---|---|---|---|---|
| Method | r = 4 | r = 20 | r = 36 | r = 52 | r = 68 | r = 84 | r = 100 | r = 116 | r = 132 | r = 148 | r = 164 | r = 180 |
| PCP | 4 | 20 | 36 | 55 | 89 | 198 | 200 | 203 | 206 | 208 | 210 | 213 |
| WNNM-RPCA | 4 | 20 | 36 | 52 | 68 | 84 | 100 | 116 | 131 | 124 | 125 | 120 |
| DPRPCA (p = 0.6) | 4 | 20 | 36 | 52 | 68 | 84 | 100 | 116 | 132 | 148 | 184 | 172 |
| SIR-HC | 4 | 20 | 36 | 52 | 68 | 84 | 100 | 116 | 132 | 148 | 164 | 192 |
| SIR-HU | 4 | 20 | 36 | 55 | 89 | 198 | 200 | 203 | 206 | 208 | 210 | 213 |
| SIR-HW | 4 | 20 | 36 | 52 | 68 | 84 | 100 | 116 | 132 | 148 | 164 | 180 |
| SIR-HG | 4 | 20 | 36 | 52 | 68 | 84 | 100 | 116 | 132 | 148 | 164 | 180 |
| SIR-HT | 4 | 20 | 36 | 52 | 68 | 84 | 63 | 27 | 19 | 16 | 13 | 11 |

Figure 7:
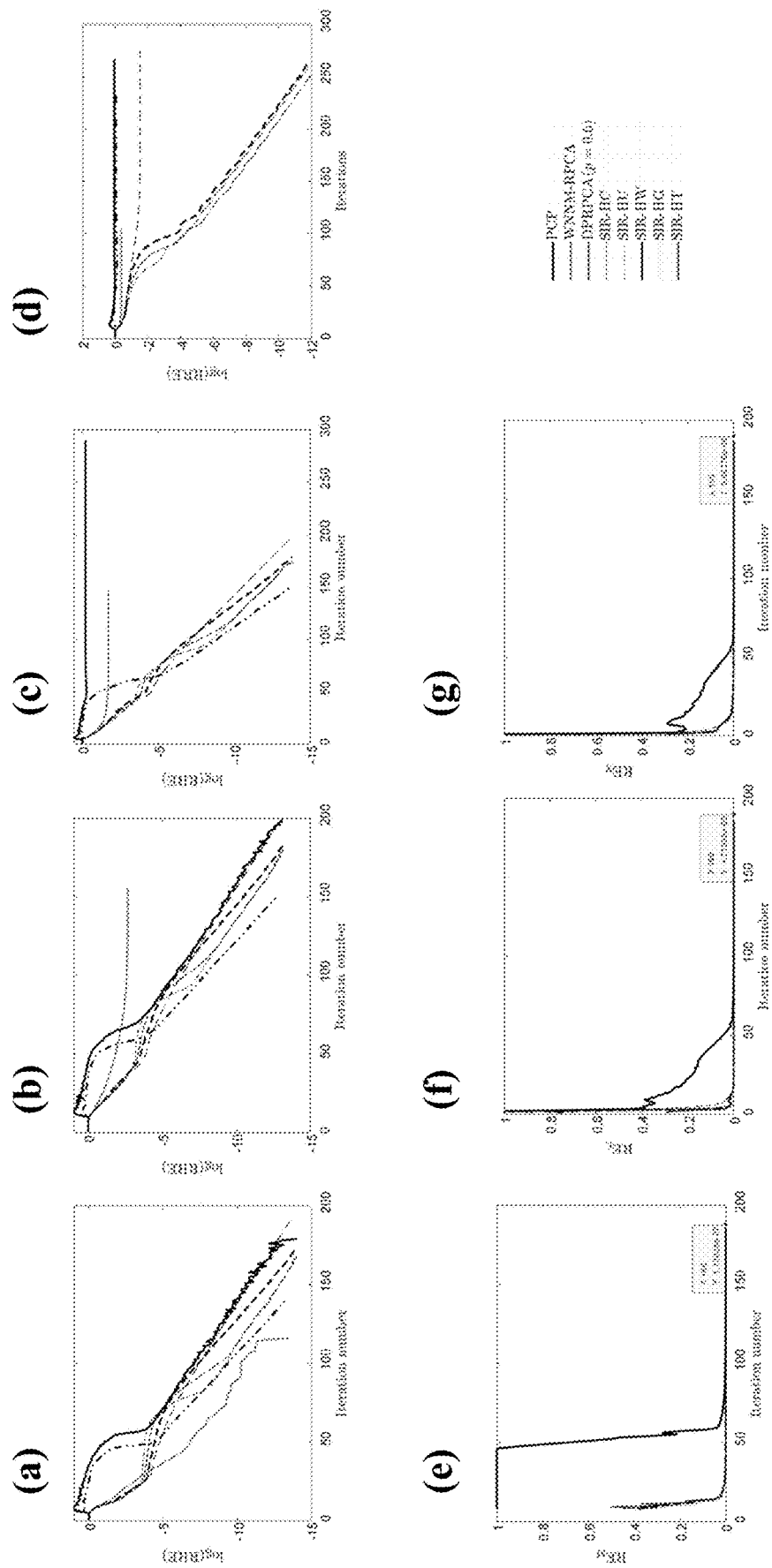
FIG. 7 illustrates the convergence curves of different techniques, including sections (a), (b), (c), (d), (e), (f), and (g)

In addition, FIG. 7 illustrates the convergence curves of different techniques. The sections (a)-(d) of FIG. 7 plot log-scale RRE versus iterations for different values of $p_r$ and $p_s$. It is easy to see that when $p_r$ or $p_s$ increases, the performance of PCP, WNNM-RPCA, DPRPCA (p=0.6), SIR-HU and SIR-HT worsens, while SIR-HW, SIR-HC and SIR-HG still operate well even when $p_r=0.3$ and $p_s=0.3$. Due to the discontinuities of the proximity operator in (11), the curve of SIR-HT oscillates. Moreover, to verify the theoretical results in Theorem 2, the relative errors for $M^k$, $E^k$ and $X-M^k-E^k$ at the k-th iteration are first defined as:

$$RE_{M^k} = \min\{1, \|M^k - M^{k-1}\|_F / \|M\|_F\} \quad (60)$$

$$RE_{E^k} = \min\{1, \|E^k - E^{k-1}\|_F / \|E\|_F\}$$

$$RE_{X^k} = \min\{1, \|X - M^k - E^k\|_F / \|X\|_F\}$$

The sections (e)-(g) of FIG. 7 show the convergence curves of $RE_{M^k}$, $RE_{E^k}$, $RE_{X^k}$ versus the iteration number at $$PSNR(M, \hat{M}) = \frac{1}{n}\sum_{j=1}^{1} PSNR(M^j, \hat{M}^j)$$

$$SSIM(M, \hat{M}) = \frac{1}{n}\sum_{j=1}^{1} SSIM(M^j, \hat{M}^j)$$

$$RMSE(M, \hat{M}) = \frac{1}{n}\sum_{j=1}^{1} \frac{\|M^j, \hat{M}^j\|_F}{\sqrt{m}}$$

where $M \in \mathbb{R}^{m \times n}$ and $\hat{M} \in \mathbb{R}^{m \times n}$ denote the ground truth and estimated matrix of the HSI, and $M^j$ and $\hat{M}^j$ are the j-th band images of M and $\hat{M}$, respectively. Besides, the higher the PSNR and SSIM, and the smaller the RMSE, the better the restoration quality.

The sub-image of the Washington DC Mall contains 191 spectral bands with 256*256 pixels per band. The gray values of each band are normalized onto [0, 1], and then each band is vectorized as a vector, which is stacked to construct the pure matrix $M \in \mathbb{R}^{65536 \times 191}$. Impulsive noise is generated by the built-in command of 'imnoise(I, 'salt & pepper', ρ)' in MATLAB, where I is the original matrix, and ρ is the normalized noise intensity. The relationship between ρ and the signal-to-noise ratio (SNR) is ρ=1/SNR. In addition, to fairly compare different algorithms, the best weighting parameter λ for each method is selected based on the lowest RRE. Impulsive noise with different ρ is added to M, and the average denoising results by 10 independent runs are tabulated in Table IV. It is observed that SIR-HC, SIR-HW and SIR-HG, achieve good restoration results, and among them, SIR-HG is in total the best method since it attains better recovery performance for all cases. Although DPRPCA (p=0.6) has smaller SSIM for one case, its choice of ρ is crucial because it employs $\ell_p$-norm to achieve sparseness. In order to provide a visual comparison, three bands of HSIs are chosen to form a pseudo-color image shown in FIG. 8. It can be seen that SIR-HG attains the best denoising in terms of PSNR value over the competing methods.

Furthermore, all methods are assessed using the real HYDICE urban dataset. Similar to related works, the bands 104-108, 139-151 and 207-210 are removed since they are seriously contaminated by noise, thus the sub-data with dimensions 256×256×188 are used. FIG. 9 shows the recovered images by setting bands 6-188-36 as R-G-B. It is seen that SIR-HW, SIR-HG and SIR-HT outperform the remaining schemes.

recovered images with bands 25-18-8 as R-G-B, in which the section (a) is the degraded image, the section (f) is the original noise-free image, and the remaining images of the sections are the restoration results by different algorithms, with a demarcated area zoomed in 8 times.

Figure 10:
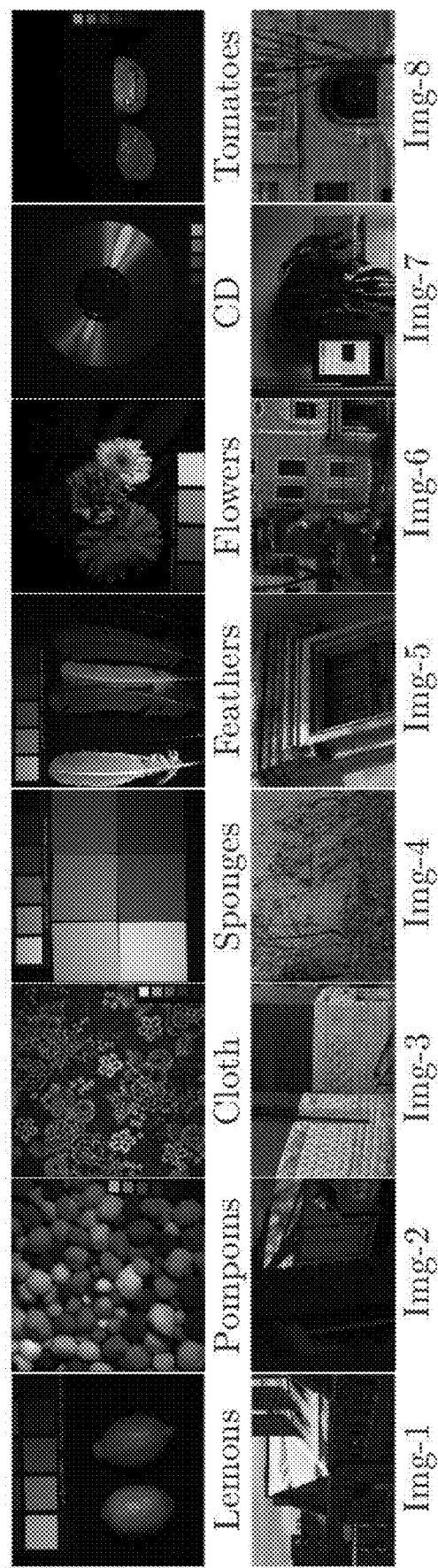
FIG. 10 depicts the images from two datasets, in which images in the first and second rows are from the CAVE and Harvard datasets, respectively.

Multispectral images (MSIs) are different from HSIs because of their higher spatial resolution. In this section, two datasets, i.e., CAVE and Harvard, are used. The CAVE dataset consists of 32 different objects, and each object has 31 spectral bands with dimensions 512×512. The Harvard database includes 50 MSIs of real-world indoor and outdoor scenes. For each set of MSIs, it has 31 spectral bands with spatial resolution 1392×1040. FIG. 10 shows the plots of sixteen MSIs from the CAVE and Harvard datasets, which are adopted to evaluate all approaches. Besides, for the MSIs in the Harvard database, each band is resized as 696×520. Moreover, 10 dB impulsive noise is added to the MSIs, and the average results of all MSIs shown in FIG. 10 are tabulated in Table V. It is observed that SIR-HW, SIR-HC and SIR-HG attain better restoration, compared with the remaining algorithms in terms of PSNR, although PCP needs less computational time. It can be concluded again that the SIR-HG generally outperforms the remaining methods because it achieves comparable restoration results in terms of PSNR, SSIM and RMSE, for the two datasets. To

TABLE IV

Average restoration results under different noise levels, in which the best three results are bold.

| Noise | Metric | PCP | WNNM-RPCA | DPRPCA (p = 0.9) | DPRPCA (p = 0.6) | SIR-HC | SIR-HW | SIR-HG | SIR-HT |
|---|---|---|---|---|---|---|---|---|---|
| ρ = 0.1 | PSNR | 50.655 | 52.577 | 52.876 | 54.961 | 56.438 | 56.621 | 56.779 | 56.056 |
|  | SSIM | 0.9976 | 0.9970 | 0.9975 | 0.9984 | 0.9987 | 0.9989 | 0.9990 | 0.9983 |
|  | RMSE | 0.00328 | 0.00269 | 0.00267 | 0.00212 | 0.00196 | 0.00198 | 0.00195 | 0.00217 |
| ρ = 0.2 | PSNR | 47.909 | 51.235 | 50.403 | 53.312 | 53.501 | 53.970 | 53.796 | 53.773 |
|  | SSIM | 0.9955 | 0.9960 | 0.9967 | 0.9974 | 0.9987 | 0.9987 | 0.9988 | 0.9977 |
|  | RMSE | 0.00446 | 0.00313 | 0.00347 | 0.00261 | 0.00240 | 0.00236 | 0.00237 | 0.00261 |
| ρ = 0.3 | PSNR | 45.105 | 49.713 | 48.103 | 51.302 | 51.935 | 51.653 | 51.683 | 51.712 |
|  | SSIM | 0.9947 | 0.9949 | 0.9961 | 0.9979 | 0.9984 | 0.9981 | 0.9983 | 0.9949 |
|  | RMSE | 0.00560 | 0.00373 | 0.00440 | 0.00309 | 0.00286 | 0.00292 | 0.00290 | 0.00342 |
| ρ = 0.4 | PSNR | 42.499 | 47.494 | 46.120 | 48.418 | 49.035 | 48.419 | 48.822 | 48.133 |
|  | SSIM | 0.9895 | 0.9931 | 0.9919 | 0.9968 | 0.9963 | 0.9953 | 0.9959 | 0.9921 |
|  | RMSE | 0.00805 | 0.00472 | 0.00566 | 0.00419 | 0.00393 | 0.00418 | 0.00401 | 0.00454 |

Figure 11:
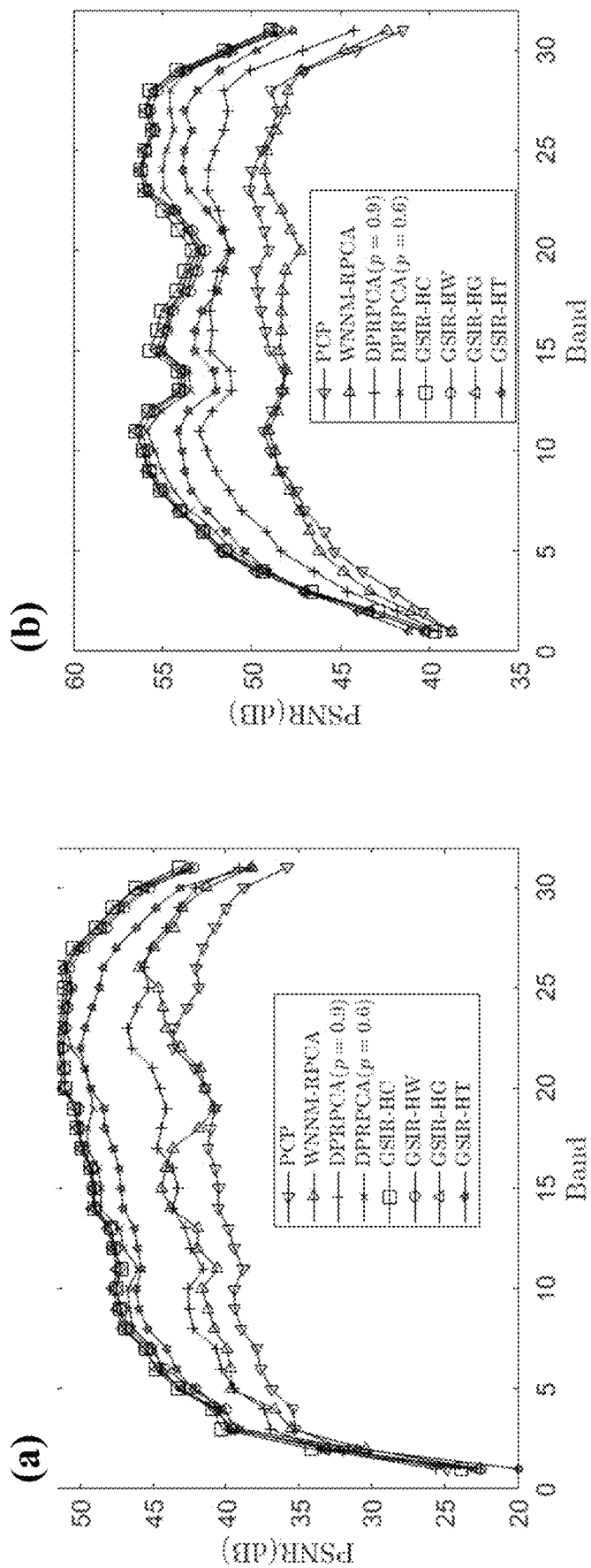
FIG. 11 illustrates average PSNR curves as functions of spectral bands by different algorithms, including sections (a) and (b)
Figure 12:
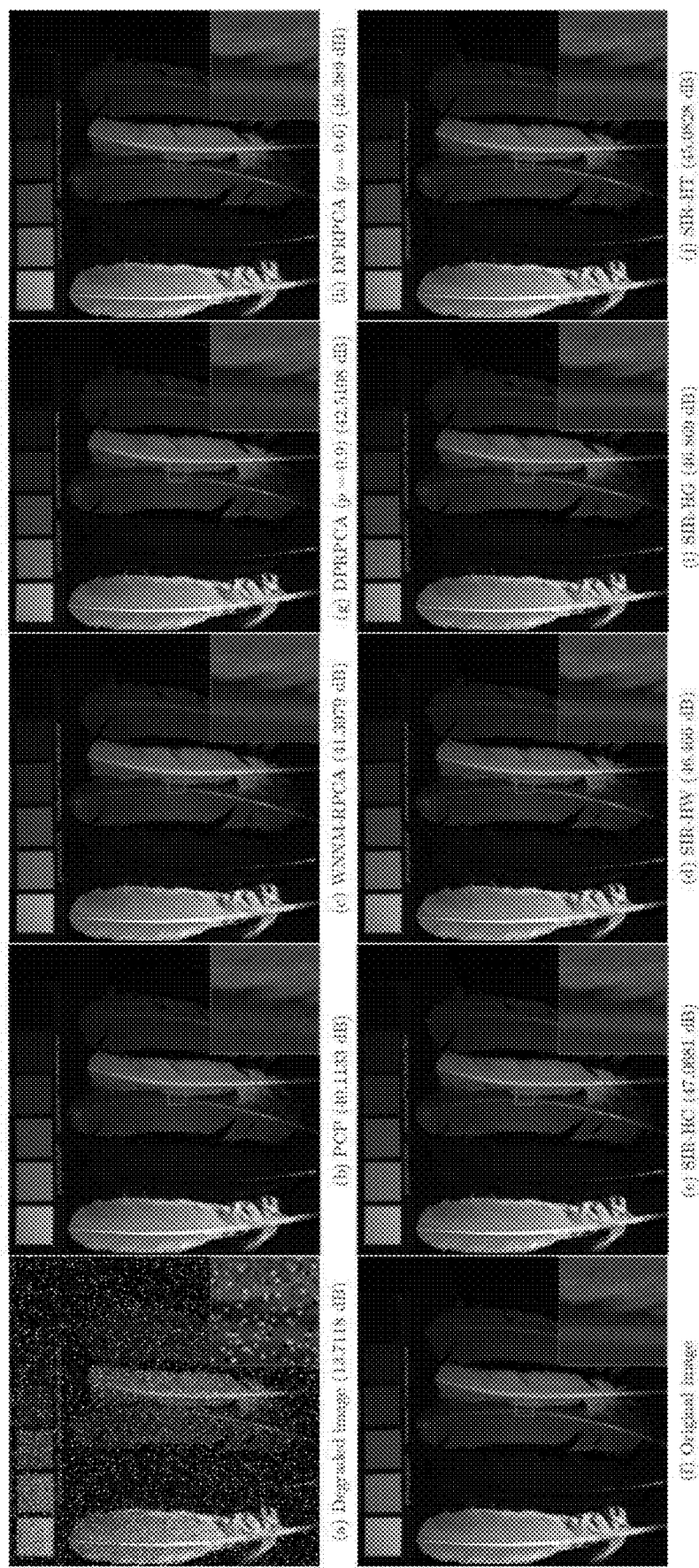
FIG. 12 depicts the recovered images with bands 23-13-4 as R-G-B with a demarcated area zoomed in 6 times, including sections (a), (b), (c), (d), (e), (f), (g), (h), (i), and (j).
Figure 13:
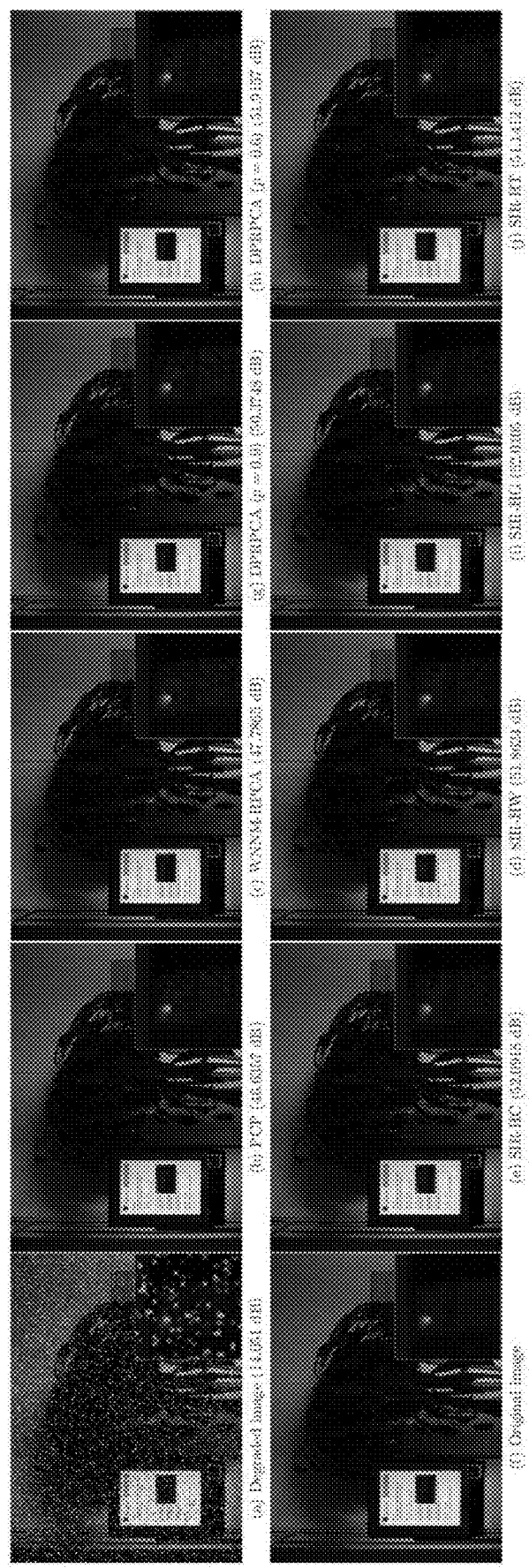
FIG. 13 depicts the recovered images with bands 25-18-8 as R-G-B with a demarcated area zoomed in 8 times, including sections (a), (b), (c), (d), (e), (f), (g), (h), (i), and (j).

Regarding multispectral image restoration, FIG. 10 depicts the images from two datasets, in which images in the first and second rows are from the CAVE and Harvard datasets, respectively, and FIG. 11 illustrates the average PSNR curves as functions of spectral bands by different algorithms, including two sections, (a) CAVE dataset and (b) Harvard dataset. Further, FIG. 12 depicts the recovered images with bands 23-13-4 as R-G-B, in which the section (a) is the degraded image, the section (f) is the original noise-free image, and the remaining images of the sections are the restoration results by different algorithms, with a demarcated area zoomed in 6 times; and FIG. 13 depicts the further compare the performance of all techniques in each spectral band, FIG. 11 shows the plots the average PSNR versus spectral band number.

It can be seen that SIR-HC, SIR-HW and SIR-HG have higher PSNR values for most of the bands in both datasets. Note that all methods perform bad in the first few bands, because there exists a blur in those bands. To provide visual comparison, FIG. 12 and FIG. 13 show the recovered images of feathers and Img-7, respectively. It is very clear that there still exists apparent noise in the images recovered by PCP, WNNM-RPCA, DPRPCA (p=0.9) and DPRPCA (p=0.6) in FIG. 12 and FIG. 13.

TABLE V

Average recovery performance comparison in terms of PSNR, SSIM, RMSE and runtime (in seconds).

| Dataset | Metric | PCP | WNNM-RPCA | DPRPCA (p = 0.9) | DPRPCA (p = 0.6) | SIR-HC | SIR-HW | SIR-HG | SIR-HT |
|---|---|---|---|---|---|---|---|---|---|
| CAVE | PSNR | 39.172 | 40.883 | 42.100 | 46.146 | 46.797 | 46.344 | 46.627 | 44.718 |
|  | SSIM | 0.6850 | 0.7680 | 0.8025 | 0.8227 | 0.8510 | 0.8510 | 0.8511 | 0.8275 |
|  | RMSE | 0.0176 | 0.0158 | 0.0155 | 0.0144 | 0.0143 | 0.0149 | 0.0148 | 0.0168 |
|  | Runtime | 35.280 | 84.001 | 124.47 | 122.88 | 73.266 | 58.677 | 70.717 | 55.583 |

TABLE V-continued

Average recovery performance comparison in terms of PSNR, SSIM, RMSE and runtime (in seconds).

| Dataset | Metric | PCP | WNNM-RPCA | DPRPCA (p = 0.9) | DPRPCA (p = 0.6) | SIR-HC | SIR-HW | SIR-HG | SIR-HT |
|---|---|---|---|---|---|---|---|---|---|
| Harvard | PSNR | 47.296 | 47.052 | 50.057 | 52.637 | 53.249 | 52.966 | 53.173 | 51.498 |
|  | SSIM | 0.9519 | 0.9112 | 0.9501 | 0.9620 | 0.9594 | 0.9629 | 0.9630 | 0.9675 |
|  | RMSE | 0.00498 | 0.00490 | 0.00371 | 0.00286 | 0.00280 | 0.00287 | 0.00281 | 0.00316 |
|  | Runtime | 51.873 | 120.35 | 177.07 | 175.03 | 103.05 | 78.789 | 96.603 | 73.717 |

With the above derivation and verification, in various embodiments, an image restoration processor is provided to perform modification to function and recovery to degraded images.

Figure 14:
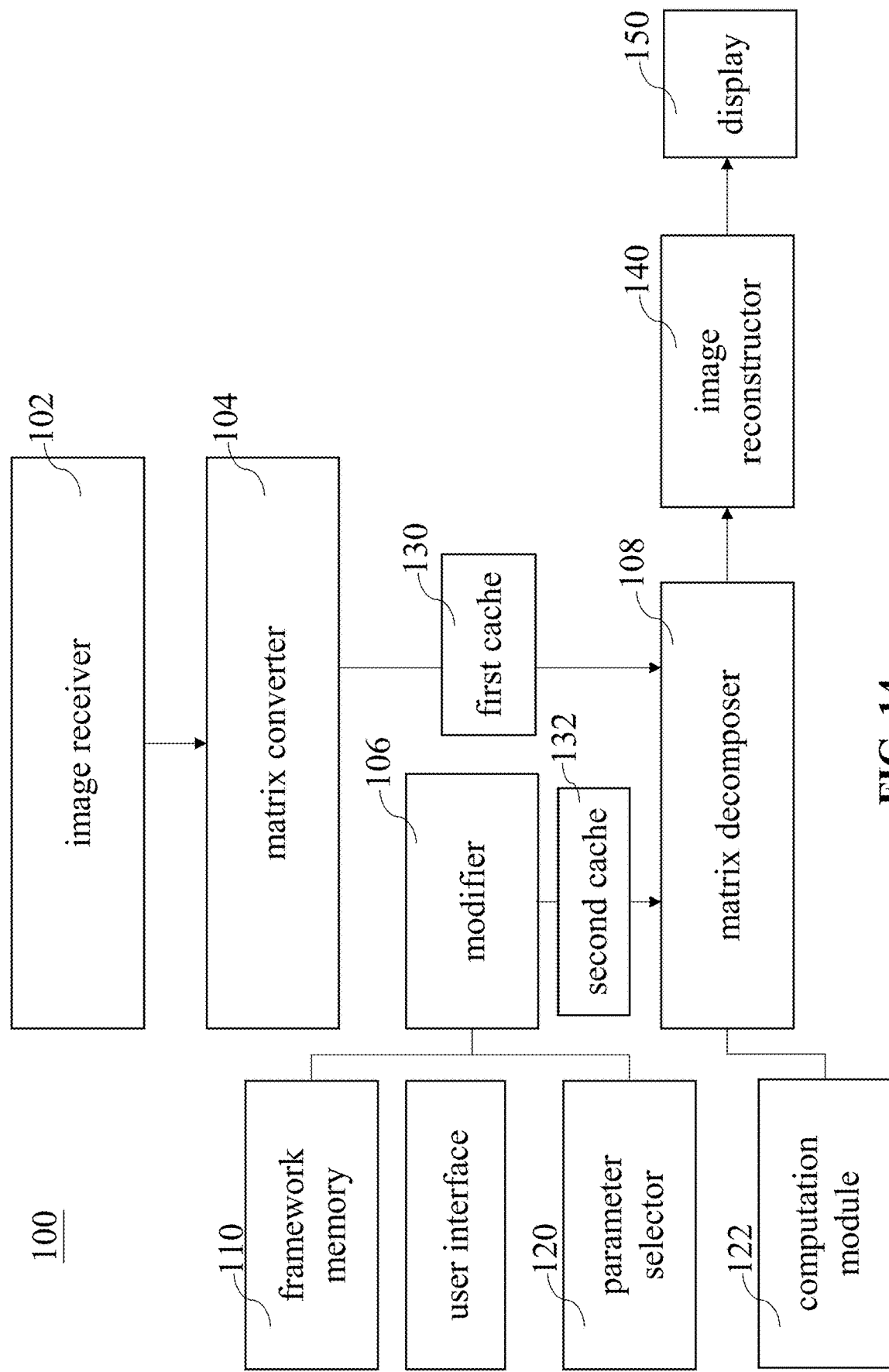
FIG. 14 depicts a schematic diagram of an image restoration processor for utilizing framework for generating sparsity regularizers for image restoration in accordance with one embodiment of the present invention.

FIG. 14 depicts a schematic diagram of an image restoration processor 100 for utilizing framework for generating sparsity regularizers for image restoration in accordance with various embodiments of the present invention. The image restoration processor 100 includes an image receiver 102, a matrix converter 104, a modifier 106, a matrix decomposer 108, a framework memory 110, a parameter selector 120, a computation module 122, a first cache 130, a second cache 132, and an image reconstructor 140. These elements can be arranged in electrical communication with others so they can send at least one information signal to others or receive at least one information signal from others.

The image receiver 102 is configured to receive at least one degraded image to be recovered. The matrix converter 104 is electrically coupled with the image receiver 102 and is configured to reshape image data of the degraded image into at least one target matrix. The degraded image or the target matrix can serve as input data to be processed by the image restoration processor 100. The matrix converter 104 is electrically coupled with the matrix decomposer 108 and is further configured to send the target matrix to the matrix decomposer 108.

The modifier 106 is electrically coupled with the framework memory 110. The framework memory 110 can be configured to store a framework as discussed above (e.g., the Proposition 1 as discussed above) for generating one or more sparsity-inducing regularizers, which enables generation of the one or more sparsity-inducing regularizers and derivation of their theoretical properties and closed-form proximity operators. The modifier 106 can receive a M-estimator from an external source. For example, users can optionally input a M-estimator to the modifier 106 for further modification. In one embodiment, the image restoration processor 100 may further include a user interface configured to receive an M-estimator from an external source and transmit an information signal to inform the modifier 106 of the received M-estimator. The modifier 106 can be configured to read the framework memory 110 and apply the framework to modify the input M-estimator. The input M-estimator can be modified by the modifier 106, as discussed above, and then the modifier 106 can accordingly output a hybrid M-estimator and generate the corresponding sparse regularizer. In an embodiment, the sparse regularizer is generated by the hybrid M-estimator in the modifier 106 and then output by the modifier 106. In some embodiment, the input M-estimator is selected from Welsch Function, Cauchy Function, and German-McClure Function. In various embodiments, the generated sparse regularizer is non-convex and has closed-form proximity operators.

The parameter selector 120 is electrically coupled with the modifier 106 and is configured to perform the parameter selection strategy as discussed above. Specifically, the parameter selector 120 can determine a relationship between a scale parameter of the sparse regularizer and a positive weighting parameter controlling sparsity.

The matrix decomposer 108 is configured to receive the target matrix and the sparse regularizer. In various embodiments, the matrix decomposer 108 can receive the target matrix and the sparse regularizer via accessing the first cache 130 and the second cache 132. For example, the first cache 130 is configured to receive the target matrix from the matrix converter 104 and store the target matrix, the second cache 132 is configured to receive the sparse regularizer from the modifier 106 and store the sparse regularizer, when the matrix decomposer 108 is triggered to perform decomposition, the matrix decomposer 108 can obtain the target matrix and the sparse regularizer via accessing the first cache 130 and the second cache 132, respectively. After the obtaining, the matrix decomposer 108 can be configured to apply the sparse regularizer to a RPCA approach, as discussed above, via decomposing the target matrix into a sum of low-rank and sparse matrices. The computation module 122 can work together to decompose the target matrix and solve the problem of the equation (52) as afore-mentioned with the matrix decomposer 108. The computation module 122 can be configured to perform an ADMM approach following with the RPCA approach performed by the matrix decomposer 108.

The image reconstructor 140 is electrically coupled with the matrix decomposer 108 and is configured to integrate outcomes of decomposition from the matrix decomposer 108 to form at least one recovered image from the original degraded image, utilizing the low-rank and sparse matrices. In an embodiment, the image restoration processor 100 can further include a display in electrical communication with the image reconstructor 140 and configured to display the recovered image and may further display a difference of the image before and after restoration.

The image restoration processor 100 can be applied as a visual rehabilitation pipeline or a digital image remastering framework, which combines specific steps or processes to restore images to their original visual state. In this regard, the image restoration processor 100 can be used for a scenario that dramatically reduces image capture resources by deliberately undersampling an image to be captured. This permits transfer of the undersampled image in less time and consuming fewer hardware resources; for example, an image transferred wirelessly will require less spectral bandwidth; an image transferred electronically will use less RAM/cache as the image is transferred over a network. As such, the image restoration processor 100 of the present invention improves network operation, particularly for networks that transmit considerable image, video, and/or radar data.

For example, hyperspectral imaging is a popular style of image acquisition which captures a multitude of two-dimensional images at different frequencies to yield more information from a scene. If the images are spectrally undersampled, image recovery according to the present invention may be performed to reconstruct the complete images. Similarly, other types of images, such as radar and MIMO images, which are related to antenna technology used in wireless communications, may also suffer from corruption during transmission. In such cases, the image restoration processor 100 can be effectively applied to restore these images, mitigating any potential misunderstandings or misinterpretations caused by the corruption. This can help ensure accurate and reliable image processing for radar and MIMO applications, enhancing the overall performance and reliability of these systems. Accordingly, in various embodiments, the image data is from one or more degraded hyperspectral images or from one or more degraded multispectral images.

Figure 15:
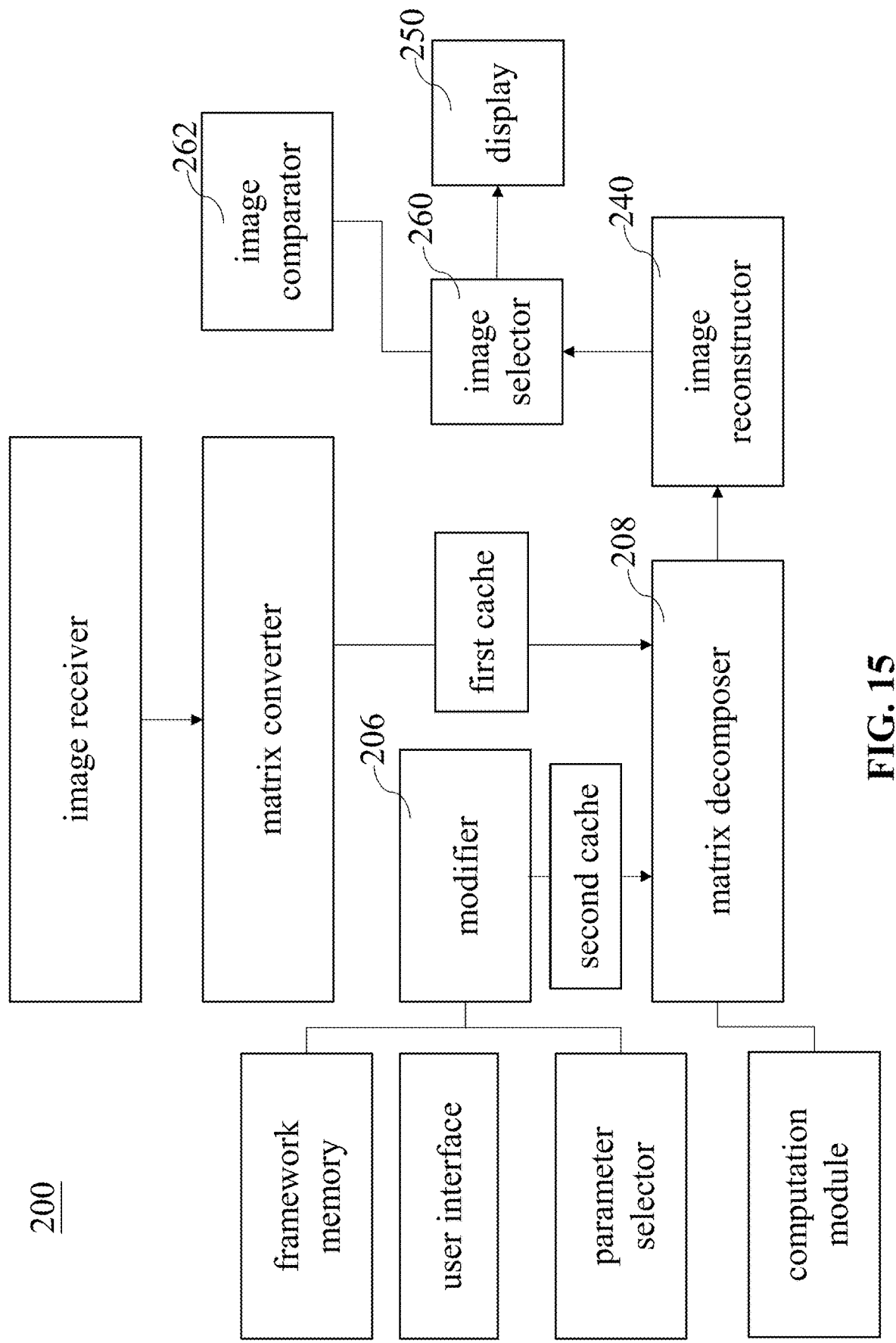
FIG. 15 depicts another schematic diagram of an image restoration processor for utilizing framework for generating sparsity regularizers for image restoration in accordance with another embodiment of the present invention.

FIG. 15 depicts a schematic diagram of an image restoration processor 200 for utilizing framework for generating sparsity regularizers for image restoration in accordance with various embodiments of the present invention. The architecture of the image restoration processor 200 illustrated in FIG. 15 is similar to that of the image restoration processor 100 illustrated in FIG. 14, expect the image restoration processor 200 further includes an image selector 260 electrically coupled between the image reconstructor 240 and the display 250.

In the image restoration processor 200 illustrated in FIG. 15, more than one M-estimator is input to the modifier 206 and accordingly the modifier 206 can output more than one sparse regularizer. For example, if two different M-estimators are input to the modifier 206, there are two different sparse regularizers generated from the modifier 206, which are modified by the same framework. As such, different sparse regularizers can be applied to a RPCA approach via decomposing the matrix into different groups of sums of low-rank and sparse matrices by the matrix decomposer 208. Thereafter, the image reconstructor 240 can integrate the outcomes of decomposition and form more than one recovered image. For example, if two different M-estimators are input to the modifier 206, the results are two recovered images formed by using different sparse regularizers from one degraded image.

The image selector 260 is configured to receive the recovered images from the image reconstructor 240 and determine which one of the recovered images is to be outputted according to the image evaluation metrics for all of the recovered images. In one embodiment, the image evaluation metrics include SNR (Signal-to-Noise Ratio), SSIM (Structural Similarity Index), and RMSE (Root Mean Square Error). The recovered image with the best image evaluation metrics can be transmit to the display 250 from the image selector 260 for displaying. In various embodiments, the display 250 electrically communicating with the image selector 260 is configured to show which function is introduced as the sparse regularizer for the output recovered image, so as to inform the user of which sparse regularizer is applied to output eventually. In various embodiments, the image restoration processor 200 can further include an image comparator 262 configured to compare the recovered images and quantify recovery performance thereof, as the tables above (e.g., TABLE I to TABLE V), thereby informing users of the quantified comparison of the recovered images.

As described above, in accordance with the various embodiments of the present invention, a framework is provided to generate sparsity promoting regularizers along with a theoretical analysis. The framework of the present invention can be applied to three M-estimators, namely, Welsch, Cauchy and GMC, and produce the IRs of those functions. It is the first time that sparsity regularizers associated with these three functions are generated. Moreover, the obtained regularizers are applied to low-rank recovery, and we propose three corresponding algorithms with convergence guarantees. Numerical examples based on both simulations and real-world data demonstrate that the image recover method of the present invention can consistently achieve outstanding restoration performance. As such, the image restoration processor of the present invention can be provided to perform the image recovery.

The Appendices as afore mentioned are provided as follows.

Figure 16:
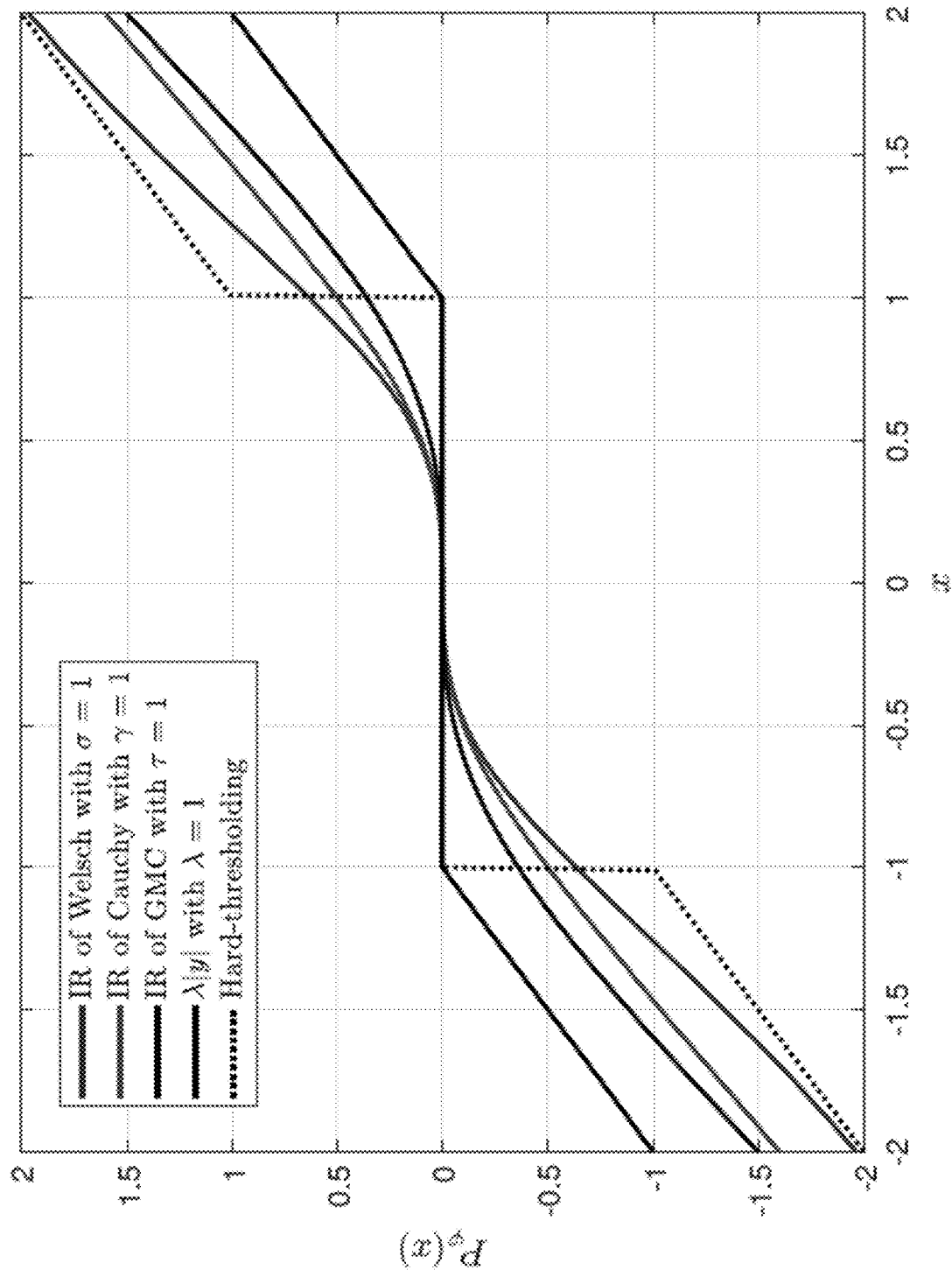
FIG. 16 illustrates the curves of P'(x) for different regularizers.

Appendix A:

FIG. 16 depicts curves of $P_\varphi(x)$ for different regularizers. A M-estimator $f(x)$ may be reformulated via a half-quadratic optimization as:

$$f(x) := \min_y \frac{1}{2}(x-y)^2 + \varphi_\lambda(y) \tag{61}$$

where $\varphi_\lambda(y)$ is the associated implicit regularizer (IR). The IRs of Welsch, Cauchy and German-McClure M-estimators are found in Table VI, but they cannot achieve sparseness. When $\varphi_\lambda(y)=\lambda|y|$, the solution to (61), denoted as $P_\varphi(x)$, is zero for $[x] \leq \lambda$. That is to say, the $\ell_1$-norm can attain sparseness and set y as zero when the magnitude of x is less than a threshold. However, when the penalty $\varphi_\lambda(y)$ is considered as the IRs of these M-estimators, sparseness cannot be attained since the solution is zero if and only if x=0. Besides, to clearly illustrate the conclusion that for regularizers tabulated in Table VI, only the $\ell_1$-norm can attain sparseness, the curves of $P_\varphi(x)$ are shown in FIG. 16.

TABLE VI

| Regularizer $\varphi_\lambda(y)$ | $l_1$ | IR (Welsch) | IR (Cauchy) | IR (German-McClure) |
|---|---|---|---|---|
| $P_\varphi(x)$ | $\begin{cases} x+\lambda, & x<-\lambda \\ 0, & \|x\| \leq \lambda \\ x-\lambda, & x>\lambda \end{cases}$ | $x - x \cdot e^{-x^2/\sigma^2}$ | $x - \dfrac{\gamma^2 x}{\gamma^2 + x^2}$ | $x - \dfrac{16\tau^2 x}{(x^2 + 4\tau^2)^2}$ |

Appendix B:

Proof of Proposition 1: Since $f^*(y)$ is convex in (16), it can be known that $$yx - f^*(y) = yx - \lambda \varphi_{g,\lambda}(y) - \frac{y^2}{2} \text{ and } -m(y) = -\frac{(y-x)^2}{2} - \lambda \varphi_{g,\lambda}(y)$$

in (18) with respect to (w.r.t.) y are concave, thus m(y) is convex w.r.t. y. That is, (19) is a convex problem.

1) According to (17), there is:

$$\varphi_{g,\lambda}(-y) = \max_{x \in \mathbb{R}} -\frac{(-y-x)^2}{2\lambda} + \frac{l_{g,\lambda}(x)}{\lambda} \tag{62}$$

$$t = -x \max_{t \in \mathbb{R}} -\frac{(-y+t)^2}{2\lambda} + \frac{l_{g,\lambda}(-t)}{\lambda}$$

-continued
$$= \max_{t \in \mathbb{R}} -\frac{(y-t)^2}{2\lambda} + \frac{l_{g,\lambda}(t)}{\lambda}$$

$$= \varphi_{g,\lambda}(y) \quad \quad (5)$$

where the penultimate equation is obtained because $l_{g,\lambda}(x)$ is an even function. Thus, $\varphi_{g,\lambda}(y)$ is symmetric.

2) According to the inversion rule of subgradient relations and (16), it is obtained:

$$\arg\max_x x \cdot y - f(x) = \partial f^*(y) = y + \lambda \partial \varphi_{g,\lambda}(y) \quad (63)$$

Besides, it is obtained via (21):

$$y = \nabla f(x^*) = \begin{cases} 0, & |x^*| \leq \lambda \\ x^* - a \cdot g'(|x^*|)\mathrm{sign}(x^*), & |x^*| > \lambda \end{cases} \quad (64)$$

Then, the solution $x^*$ in (63) is discussed in terms of two cases, namely, $y>0$ and $y=0$. Moreover, $q(x)=x \cdot y - f(x)$ is defined, which is a concave function since $f(x)$ is convex, thus the solution $x^*$ for (63) satisfies $\nabla q(x^*)$, and $y=f'(x^*)$ is obtained.

3) According to (63), when $y>0$, the solution to $$\arg\max_x y \cdot x - f(x)$$

is unique, and it satisfies:

$$y = x^* - a \cdot g'(|x^*|)\mathrm{sign}(x^*) \quad (65)$$

implying that $y<x^*$ due to $\cdot g'(|x|)\mathrm{sign}(x)>0$ since $g(x)$ is a monotonically increasing function, and by (63)($x^* = y + \lambda \varphi'_{g,\lambda}(y)$, note that $\partial \varphi_{g,\lambda}(y)$ is replaced with $\varphi'_{g,\lambda}(y)$ because $\varphi_{g,\lambda}(y)$ is differentiable for $|y|>0$), the obtained is $\varphi'_{g,\lambda}(y)>0$. Therefore, $\varphi_{g,\lambda}(y)$ increases with $y$ for $y>0$ and $\varphi_{g,\lambda}(y)$ is nonnegative because $\varphi_{g,\lambda}(0)=0$.

4) To verify $\varphi_{g,\lambda}(y_1+y_2) \leq \varphi_{g,\lambda}(y_1) + \varphi_{g,\lambda}(y_2)$ for any $y_1, y_2 \in \mathbb{R}$, the discussion is provided for the following three cases. First, if $y_1 \cdot y_2 = 0$ and suppose that $y_1 \neq 0$ and $y_2 \neq 0$, the obtained is $\varphi_{g,\lambda}(y_1+y_2) = \varphi_{g,\lambda}(y_1) \leq \varphi_{g,\lambda}(y_1) + \varphi_{g,\lambda}(0) = \varphi_{g,\lambda}(y_1) + \varphi_{g,\lambda}(y_2)$ because $\varphi_{g,\lambda}(0)=0$.

If $y_1 \cdot y_2 > 0$ and it is first assumed that $y_1>0$ and $y_2>0$, then for any $y>0$, there is (65) and by (16), it is obtained that $y$ increases with $x^*$ increasing. Combining $x^* = y + \lambda \varphi'_{g,\lambda}(y)$ and (65), it is known $\varphi'_{g,\lambda}(y) = a/\lambda \cdot g'(|x^*|)\mathrm{sign}(x^*)$. Besides, it is assumed that $g(x)$ is a concave function for $x>\lambda$ and then $g'(x)$ decreases with $x$ increasing. Therefore, $\varphi'_{g,\lambda}(y)$ decreases as $y$ increases. That is, $\varphi_{g,\lambda}(y)$ is a concave function. Thus, $$\int_0^{y_2} \varphi'_{g,\lambda}(y_1+y) - \varphi'_{g,\lambda}(y)dy =$$

$$\varphi_{g,\lambda}(y_1+y_2) - \varphi_{g,\lambda}(y_2) - \varphi_{g,\lambda}(y_1) + \varphi_{g,\lambda}(0) \leq 0$$

Then, there is $\varphi_{g,\lambda}(y_1+y_2) \leq \varphi_{g,\lambda}(y_1) + \varphi_{g,\lambda}(y_2)$. On the other hand, if $y_1 \cdot y_2 > 0$, $y_1 < 0$ and $y_2 < 0$, it is easy to obtain via (62):

$$\varphi_{g,\lambda}(y_1+y_2) = \varphi_{g,\lambda}(-y_1-y_2)$$

$$\leq \varphi_{g,\lambda}(-y_1) + \varphi_{g,\lambda}(-y_2)$$

$$= \varphi_{g,\lambda}(y_1) + \varphi_{g,\lambda}(y_2)$$

Finally, if $y_1 \cdot y_2 < 0$ and it is supposed that $y_1 > 0$ and $y_2 < 0$, the conclusion is drawn immediately from $\varphi_{g,\lambda}(y_1+y_2) \leq \varphi_{g,\lambda}(y_1+|y_2|) \leq \varphi_{g,\lambda}(y_1) + \varphi_{g,\lambda}(|y_2|) = \varphi_{g,\lambda}(y_1) + \varphi_{g,\lambda}(y_2)$.

Appendix C:

Proof of Proposition 2: When, $\sigma \leq \sqrt{2}\lambda$, $\gamma \leq \lambda$ and $\tau \leq \sqrt{3}\lambda/2$, it is known that $\Delta d$ for $\varphi_{g,\lambda}(y)$, $\varphi_{\gamma,\lambda}(y)$ and $\varphi_{\tau,\lambda}(y)$ is non-increasing. When $|x|=\lambda$, $\Delta d$ obtains the maximum value, i.e., $\lambda$, thus $\Delta d \leq \lambda$ for the above three regularizers. While when $\varphi(y)=\lambda|y|$, $\Delta d=\lambda$, thus the proof is complete.

Appendix D:

Proof of Proposition 3: According to Definition 3, $\varphi_{\bullet,\lambda}(y)$ is separable, thus there is:

$$\arg\min_{\{y_i\}} \Sigma_{i=1}^n \frac{1}{2}\|x_i - y_i\|_2^2 + \varphi_{\bullet,\lambda}(y_i)$$

with solution being:

$$y_i = P\varphi_{\bullet,\lambda}(x_i) = \max\{0, |x_i| - a \cdot g'(|x_i|)\} \cdot \mathrm{sign}(x_i)$$

thus, $$y = P\varphi_{\bullet,\lambda}(x) = \max\{0, |x_i| - a \cdot g'(|x|)\} \cdot \mathrm{sign}(x)$$

where $P\varphi_{\bullet,\lambda}(\bullet)$ is a point-wise operator.

Besides, when $\sigma \leq \sqrt{2}\lambda$, $\gamma \leq \lambda$ and $\tau \leq \sqrt{3}\lambda/2$, it can be known via Proposition 2:

$$\|x - P\varphi_{\bullet,\lambda}(x)\|_2^2 = \sum_{i=1}^n (x_i - P\varphi_{\bullet,\lambda}(x_i))^2 \leq \sum_{i=1}^n (x_i - P \cdot |_{\lambda}(x_i))^2 \leq n\lambda^2$$

thus, there is $\|x - P\varphi_{\bullet,\lambda}(x)\|_2 \leq \sqrt{n}\lambda$

Appendix E:

Proof of Proposition 4: The proof follows exactly as in the case of Proposition 3 because Definition 4 shows that $\varphi_{\bullet,\lambda}(Y)$ is separable.

In addition, when $\sigma \leq \sqrt{2}\lambda$, $\gamma \leq \lambda$ and $\tau \leq \sqrt{3}\lambda/2$, via Proposition 2, there is:

$$\|X - P\varphi_{\bullet,\lambda}(X)\|_F^2 =$$

$$\sum_{i=1}^m \sum_{j=1}^n (X_{i,j} - P\varphi_{\bullet,\lambda}(X_{i,j}))^2 \leq \sum_{i=1}^m \sum_{j=1}^n (X_{i,j} - P \cdot |_{\lambda}(X_{i,j}))^2 \leq mn\lambda^2$$

thus, there is $\|X - P\varphi_{\bullet,\lambda}(X)\|_F \leq \sqrt{mn}\lambda$

Appendix F:

Proof of Proposition 5: Let $X=U\,\mathrm{Diag}(s)V^T$ be the SVD of a rank-r matrix $X \in \mathbb{R}^{m \times n}$, where $s=[s_1, s_2, \ldots, s_\gamma]^T$ is the vector of singular values, and $$\|P_{\|\cdot\|_{\varphi,\lambda}}(X) = \|U\ Diag(s^*)V^T,$$

there is:

$$\left\|X - P_{\|\cdot\|_{\varphi,\lambda}}(X)\right\|_F^2 = \|U\ Diag(s)V^T - U\ Diag(s^*)V^T\|_F^2 =$$
$$\|Diag(s) - Diag(s^*)\|_F^2 = \|s - s^*\|_F^2 = \|s - P_{\varphi,\lambda}(s)\|_F^2 \leq \gamma\lambda^2$$

where the last inequality is due to Proposition 3.

Therefore, $$\left\|X - P_{\|\cdot\|_{\varphi,\lambda}}(X)\right\|_F \leq \sqrt{\gamma}\lambda$$

is obtained.

Appendix G:

Before the proof, the definition of a critical point and the following proposition are first stated as follows.

Definition 7. Suppose that $f$ is a function of M, E and $\Lambda$. If M, E and $\Lambda$ satisfy:

$$0 \in \frac{\partial f(M, E, \Lambda)}{\partial M}$$
$$0 \in \frac{\partial f(M, E, \Lambda)}{\partial E}$$
$$0 \in \frac{\partial f(M, E, \Lambda)}{\partial \Lambda}$$

then, {M, E, $\Lambda$} is a critical point of $f$.

Proposition 6.: Defining $h_1(\sigma,\lambda)=\lambda\varphi_{\sigma,\lambda}(y)$, $h_2(\gamma\lambda)=\lambda\varphi_{\gamma,\lambda}(y)$ and $h_3(\tau,\lambda)=\lambda\varphi_{\tau,\lambda}(y)$, then when y>0, $h_1(\sigma, \lambda)$, $h_2(\gamma, \lambda)$ and $h_3(\tau, \lambda)$ increases with $\lambda_\lambda$ and their corresponding parameters $\sigma$, $\gamma$ and $\tau$, respectively.

Proof:

According to (17), there is $$h_1(\sigma, \lambda) = -\frac{(y-x^*)^2}{2} + l_{\sigma,\lambda}(x^*).$$

By (21) or the section (b) of FIG. 2, it can be known x>$\lambda$ for y>0, thus there is only need to verify that h($\sigma$, $\lambda$) increases with $\lambda$ and $\sigma$ when x*>$\lambda$. Then, $$\frac{\partial h_1}{\partial \lambda} =$$
$$\lambda\left(1 - e^{-\frac{\lambda^2-(x^*)^2}{\sigma^2}}\right) > 0 \text{ and } \frac{\partial h_1}{\partial \sigma} = \left(\sigma e^{\frac{(x^*)^2-\lambda^2}{\sigma^2}} - \sigma + \frac{\lambda^2-(x^*)^2}{\sigma^2}\right)e^{\frac{\lambda^2-(x^*)^2}{\sigma^2}} >$$
$$\left(\sigma\left(\frac{(x^*)^2-\lambda^2}{\sigma^2}+1\right) - \sigma + \frac{\lambda^2-(x^*)^2}{\sigma}\right)e^{\frac{\lambda^2-(x^*)^2}{\sigma^2}} = 0$$

is checked. Thus, $h_1(\sigma, \lambda)$ increases with $\lambda$ and $\sigma$. Similarly, it can be verified that $h_2(\gamma, \lambda)$ and $h_3(\tau, \lambda)$ increases with $\lambda$ and their corresponding parameters $\gamma$ and $\tau$, respectively.

Proof of Theorem 2:

Let $U^k\ Diag(s^k)(V^k)^T$ be the SVD of the matrix $$\tilde{M}^k = X - E^{k+1} + \frac{\Lambda^k}{\rho^k}, \tilde{M}^k \in \mathbb{R}^{m\times n},$$

where $s^k = [s_1^k, s_2^k, \ldots, s_r^k]^T$ is the vector of singular values, r is the rank of $\tilde{M}^k$ and r<<min(m, n)). Thus, $\{\Lambda^k\}$ is bounded because:

$$\left\|\Lambda^{k+1}\right\|_F^2 = \left\|\Lambda^k + \rho^k(X - M^{k+1} - E^{k+1})\right\|_F^2 = \tag{66}$$
$$(\rho^k)^2\left\|X - E^{k+1} + \frac{\Lambda^k}{\rho^k} - M^{k+1}\right\|_F^2 =$$
$$(\rho^k)^2\left\|U^k Diag(s^k)(V^k)^T - U^k Diag((s^*)^k)(V^k)^T\right\|_F^2 =$$
$$(\rho^k)^2\left\|Diag(s^k) - Diag((s^*)^k)\right\|_F^2 =$$
$$(\rho^k)^2\left\|Diag(s^k) - Diag(P\varphi_{\cdot,1/\rho^k}(s^k))\right\|_F^2 \leq$$
$$(\rho^k)^2\left\|Diag(s^k) - Diag(P_{|\cdot|,1/\rho^k}(s^k))\right\|_F^2 \overset{a}{\leq} (\rho^k)^2\sum_{i=1}^r 1/(\rho^k)^2 \leq r \leq \min(m, n)$$

where a is owing to Proposition 3.

According to the update equations of $E^{k+1}$ and $\Lambda^k$, it is obtained:

$$E^{k+1} = P\varphi_{\cdot,\lambda/\rho^k}\left(X - M^k + \frac{\Lambda^k}{\rho^k}\right)$$

and $$E^k = X - M^k - \frac{\Lambda^k - \Lambda^{k-1}}{\rho^{k-1}}$$

Thus, there is:

$$\lim_{k\to\infty}\left\|E^{k+1} - E^k\right\|_F^2 = \left\|P\varphi_{\cdot,\lambda/\rho^k}\left(X - M^k + \frac{\Lambda^k}{\rho^k}\right) - \left(X - M^k - \frac{\Lambda^k - \Lambda^{k-1}}{\rho^{k-1}}\right)\right\|_F^2 =$$
$$\lim_{k\to\infty}\left\|P\varphi_{\cdot,\lambda/\rho^k}\left(X - M^k + \frac{\Lambda^k}{\rho^k}\right) - \left(X - M^k + \frac{\Lambda^k}{\rho^k}\right) + \frac{\Lambda^k}{\rho^k} + \frac{\Lambda^k - \Lambda^{k-1}}{\rho^{k-1}}\right\|_F^2 \leq$$
$$\lim_{k\to\infty}\left\|P\varphi_{\cdot,\lambda/\rho^k}\left(X - M^k + \frac{\Lambda^k}{\rho^k}\right) - \left(X - M^k + \frac{\Lambda^k}{\rho^k}\right)\right\|_F^2 +$$
$$\lim_{k\to\infty}\left\|\frac{\Lambda^k}{\rho^k} + \frac{\Lambda^k - \Lambda^{k-1}}{\rho^{k-1}}\right\|_F^2 \leq \lim_{k\to\infty}\frac{\lambda^k mn}{(\rho^k)^2} + \lim_{k\to\infty}\left\|\frac{\Lambda^k}{\rho^k} + \frac{\Lambda^k - \Lambda^{k-1}}{\rho^{k-1}}\right\|_F^2 = 0$$

where the last inequality is owing to Proposition 4.

Similarly, according to the updates of $M^{k+1}$ and $\Lambda^k$, the obtained is:

$$M^{k+1} = P_{\|\cdot\|\varphi,1/\rho^k}\left(X - E^{k+1} + \frac{\Lambda^k}{\rho^k}\right)$$

and

-continued $$M^k = X - E^k - \frac{\Lambda^k - \Lambda^{k-1}}{\rho^{k-1}}$$

Thus, there is:

$$\lim_{k \to \infty} \|M^{k+1} - M^k\|_F^2 = \left\|P_{\|\cdot\|_{\varphi,1/\rho^k}}\left(X - E^{k+1} + \frac{\Lambda^k}{\rho^k}\right) - \right.$$

$$\left.\left(X - E^k - \frac{\Lambda^k - \Lambda^{k-1}}{\rho^{k-1}}\right)\right\|_F^2 = \lim_{k \to \infty} \left\|P_{\|\cdot\|_{\varphi,1/\rho^k}}\left(X - E^{k+1} + \frac{\Lambda^k}{\rho^k}\right) - \right.$$

$$\left.\left(X - E^{k+1} + \frac{\Lambda^k}{\rho^k}\right) + E^k - E^{k+1} + \frac{\Lambda^k}{\rho^k} + \frac{\Lambda^k - \Lambda^{k-1}}{\rho^{k-1}}\right\|_F^2 \le$$

$$\lim_{k \to \infty}\left\|P_{\|\cdot\|_{\varphi,1/\rho^k}}\left(X - E^{k+1} + \frac{\Lambda^k}{\rho^k}\right) - X + E^{k+1} - \frac{\Lambda^k}{\rho^k}\right\|_F^2 +$$

$$\lim_{k \to \infty} \|E^k - E^{k+1}\|_F^2 + \lim_{k \to \infty}\left\|\frac{\Lambda^k}{\rho^k} + \frac{\Lambda^k - \Lambda^{k-1}}{\rho^{k-1}}\right\|_F^2 = 0$$

It is easy to obtain:

$$\lim_{k \to \infty} \|X - M^{k+1} - E^{k+1}\|_F^2 = \lim_{k \to \infty} \frac{1}{\rho^k}\|\Lambda^{k+1} - \Lambda^k\|_F^2 = 0$$

However, the preceding Frobenius norm conditions cannot guarantee the boundedness of $M^k$ and $E^k$. Next, their boundedness will be established via the boundedness of $\mathcal{L}_\rho k(M^k, E^k, \Lambda^k)$ per iteration. Since the updates of $E^k$ and $M^k$ are the minimizers of their corresponding optimization problems, there is:

$$\mathcal{L}_{\rho^k}(M^k, E^{k+1}, \Lambda^k) \le \mathcal{L}_{\rho^k}(M^k, E^k, \Lambda^k) \quad (67)$$

$$\mathcal{L}_{\rho^k}(M^{k+1}, E^{k+1}, \Lambda^k) \le \mathcal{L}_{\rho^k}(M^k, E^{k+1}, \Lambda^k)$$

After updating $\Lambda^{k+1}$ and $\rho^{k+1}$, there is:

$$\mathcal{L}_{\rho^{k+1}}(M^{k+1}, E^{k+1}, \Lambda^{k+1}) \overset{b}{\le} \mathcal{L}_{\rho^k}(M^{k+1}, E^{k+1}, \Lambda^k) + \quad (68)$$

$$\langle \Lambda^{k+1}/\rho^{k+1} - \Lambda^k/\rho^k, X - M^{k+1} - E^{k+1}\rangle =$$

$$\mathcal{L}_{\rho^k}(M^{k+1}, E^{k+1}, \Lambda^k) + \langle \Lambda^{k+1}/\rho^{k+1} - \Lambda^k/\rho^k, (\Lambda^{k+1} - \Lambda^k)/\rho^k\rangle =$$

$$\mathcal{L}_{\rho^k}(M^{k+1}, E^{k+1}, \Lambda^k) + 1/(\rho^k)^2\langle\Lambda^{k+1}/\mu - \Lambda^k, \Lambda^{k+1} - \Lambda^k\rangle =$$

$$\mathcal{L}_{\rho^k}(M^{k+1}, E^{k+1}, \Lambda^k) +$$

$$1/(\rho^k)^2(\|\Lambda^{k+1}\|_F^2/\mu + \|\Lambda^k\|_F^2 - 1/\mu\langle\Lambda^{k+1}, \Lambda^k\rangle - \langle\Lambda^k, \Lambda^{k+1}\rangle) \le$$

$$\mathcal{L}_{\rho^k}(M^{k+1}, E^{k+1}, \Lambda^k) + 1/(\rho^k)^2((3/(2\mu)) + 1/2)\|\Lambda^{k+1}\|_F^2 +$$

$$(3/2 + 1/(2\mu))\|\Lambda^k\|_F^2) \overset{c}{\le} \mathcal{L}_{\rho^k}(M^{k+1}, E^{k+1}, \Lambda^k) + Qr/(\rho^k)^2$$

where b and c are due to Proposition 6 and (66), respectively, and Q is a constant w.r.t. μ. Combining (67) and (68), there is:

$$\mathcal{L}_{\rho^{k+1}}(M^{k+1}, E^{k+1}, \Lambda^{k+1}) \le \mathcal{L}_{\rho^k}(M^k, E^k, \Lambda^k) + Qr/(\rho^k)^2$$

Thus, there is:

$$\mathcal{L}_{\rho^k}(M^k, E^k, \Lambda^k) \le \mathcal{L}_{\rho^0}(M^0, E^0, \Lambda^0) + \sum_{i=0}^{k-1} Qr/(\rho^k)^2$$

Given $M^0$, $E^0$ and $\Lambda^0$ are bounded, since $$\lim_{k \to \infty} \sum_{i=0}^{k-1} \frac{1}{(\rho^i)^2} = \frac{\mu^2}{\rho^0(\mu^2 - 1)} < \infty,$$

it is known that $\mathcal{L}_\rho k(M^k, E^k, \Lambda^k)$ is bounded from above. Therefore, $\mathcal{L}_\rho k(M^k, E^{k+1}, \Lambda^k)$ and $\mathcal{L}_\rho k(M^{k+1}, E^{k+1}, \Lambda^k)$ are bounded from above via (67), implying that the updates of $E^{k+1}$ or $M^{k+1}$ per iteration are bounded. This is because if $\|E^{k+1}\|_F^2 \to \infty$ or $\|M^{k+1}\|_F^2 \to \infty$, then $\mathcal{L}_\rho k(M^k, E^{k+1}, \Lambda^k) \to \infty$ or $\mathcal{L}_\rho k(M^{k+1}, E^{k+1}, \Lambda^k) \to \infty$.

By Bolzano-Weierstrass theorem, the boundedness of $\{M^k, E^k, \Lambda^k\}$ suggests that there exists at least one accumulation point $\{M^*, E^*, \Lambda^*\}$ for $\{M^k, E^k, \Lambda^k\}$. That is, there exists a subsequence $\{M^{kj}, E^{kj}, \Lambda^{kj}\}$ such that:

$$\lim_{k_j \to \infty} E^{k_j} = E^* \quad (69)$$

$$\lim_{k_j \to \infty} M^{k_j} = M^*$$

$$\lim_{k_j \to \infty} \Lambda^{k_j} = \Lambda^*$$

Since the proximal operator is the closed-form solution to the Moreau envelope of the sparsity-inducing regularizers, that is, $E^{k+1}$ and $M^{k+1}$ are the minimizers of (56) and (58), respectively, although the regularizers are nonconvex, there is:

$$0 \in \frac{\partial \mathcal{L}(M^k, E^{k+1}, \Lambda^k)}{\partial E} \quad (70)$$

$$0 \in \frac{\partial \mathcal{L}(M^{k+1}, E^{k+1}, \Lambda^k)}{\partial M}$$

In addition, $$\frac{\partial \mathcal{L}(M^k, E^{k+1}, \Lambda^k)}{\partial E} = \frac{\partial \mathcal{L}(M^{k+1}, E^{k+1}, \Lambda^{k+1})}{\partial E} -$$

$$\rho^k\left(M^{k+1} - M^k + \frac{\Lambda^k - \Lambda^{k+1}}{\rho^k}\right)$$

$$\frac{\partial \mathcal{L}(M^{k+1}, E^{k+1}, \Lambda^k)}{\partial M} = \frac{\partial \mathcal{L}(M^{k+1}, E^{k+1}, \Lambda^{k+1})}{\partial M} + M^{k+1}$$

$$\frac{\partial \mathcal{L}(M^{k+1}, E^{k+1}, \Lambda^{k+1})}{\partial \Lambda} = X - M^{k+1} - E^{k+1} = (\Lambda^{k+1} - \Lambda^k)/\rho^k$$

Thus, the following can be obtained via combining (69) and (70):

$$\lim_{k_j \to \infty} \frac{\partial \mathcal{L}(M^{k_j+1}, E^{k_j+1}, \Lambda^{k_j+1})}{\partial E} =$$

-continued $$\lim_{k_j\to\infty} \frac{\partial \mathcal{L}(M^{k_j}, E^{k_j+1}, \Lambda^{k_j})}{\partial E} + \lim_{k_j\to\infty} \rho^{k_j}\left(M^{k_j+1} - M^{k_j} + \frac{\Lambda^{k_j} - \Lambda^{k_j+1}}{\rho^{k_j}}\right) \ni 0$$

$$\lim_{k_j\to\infty} \frac{\partial \mathcal{L}(M^{k_j+1}, E^{k_j+1}, \Lambda^{k_j+1})}{\partial M} = \lim_{k_j\to\infty} \frac{\partial \mathcal{L}(M^{k_j+1}, E^{k_j+1}, \Lambda^{k_j})}{\partial M} -$$

$$\lim_{k_j\to\infty} (\Lambda^{k_j} - \Lambda^{k_j+1}) \ni 0$$

$$\lim_{k_j\to\infty} \frac{\partial \mathcal{L}(M^{k_j+1}, E^{k_j+1}, \Lambda^{k_j+1})}{\partial \Lambda} = (\Lambda^{k_j+1} - \Lambda^{k_j})/\rho^{k_j} \ni 0$$

Therefore, any accumulation point $\{M^*, E^*, \Lambda^*\}$ is a critical point.

Figure 17:
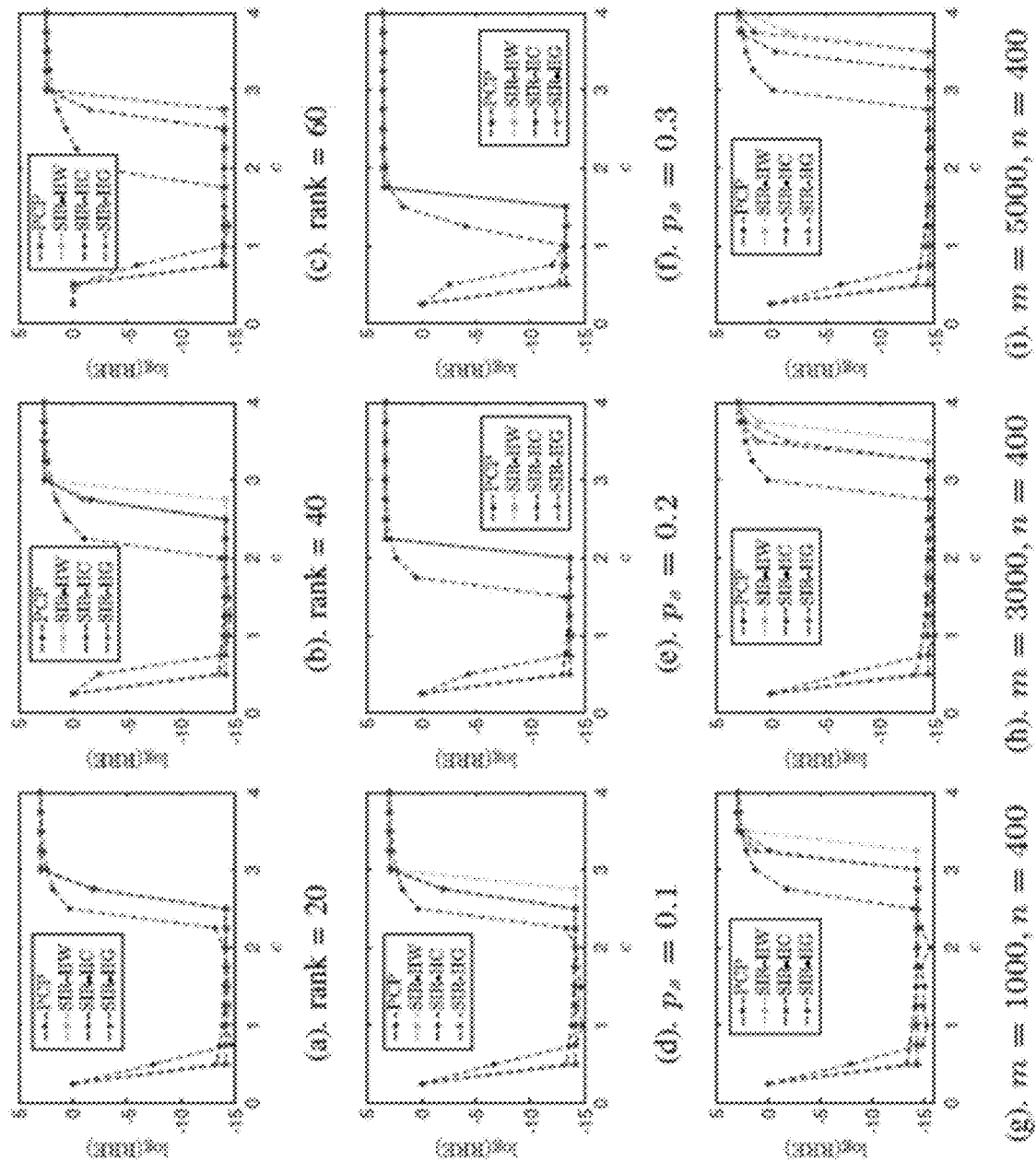
FIG. 17 illustrates the Log-scale RRE versus $\lambda$, including sections (a), (b), (c), (d), (e), (f), (g), (h), and (i).

Appendix H:

FIG. 17 plots corresponding results in terms of log-scale RRE versus c, in which sections (a)-(c), (d)-(f) and (g)-(i) show the influence of matrix rank, ratio of outliers and matrix dimensions, respectively. Specifically, FIG. 17 depicts Log-scale RRE versus c, in which the sections (a)-(b) plot the curves for different methods with only varying rank, and $p_s=0.1$ as well as m=n=400 keep fixed; the sections (e)-(g) show the curves for different outlier ratios $p_s$, and $p_r=0.05$ as well as m=n=400; the sections (g)-(i) plot the curves by varying dimensions, and $p_r=0.05$ as well as $p_s=0.1$.

Motivated by PCP, the parameter $\lambda$ is chosen as $c/\sqrt{\max(m,n)}$, i.e., $\lambda=c/\sqrt{\max(m,n)}$, where c is a constant. The value of c is investigated in three cases, that is, different matrix rank, ratio of outliers and matrix dimensions.

It can be seen that the range of proper values of c for the proposed algorithms is larger than that of PCP, and compared with PCP, the matrix rank and dimensions have little impact on the choice of c for the proposed methods. Besides, the range of c for all techniques decreases with the increase of ratio of outliers, thus it is set $\lambda=1/\sqrt{\max(m,n)}$ in the synthetic data for convenience, because all the methods including PCP have a comparable recovery performance although $\lambda$ is not the optimal value for the current settings.

The functional units and modules of the image restoration processor and methods in accordance with the embodiments disclosed herein may be embodied in hardware or software. That is, the claimed image restoration processor may be implemented entirely as machine instructions or as a combination of machine instructions and hardware elements. Hardware elements include, but are not limited to, computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

The image restoration processor may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMS, flash memory devices, or any type of media or devices suitable for storing instructions, codes, and/or data.

The image restoration processor may also be configured as distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. An image restoration processor, comprising:
   an image receiver configured to receive one or more degraded images;
   a matrix converter configured to reshape image data of the one or more degraded images into one or more target matrices;
   a framework memory configured to store a framework for generating one or more sparsity-inducing regularizers, which enables generation of the one or more sparsity-inducing regularizers and derivation of their theoretical properties and closed-form proximity operators;
   a modifier configured to read the framework memory and apply the framework to modify an M-estimator and accordingly output a hybrid M-estimator and a sparse regularizer corresponding to the hybrid M-estimator;
   a matrix decomposer configured to receive the one or more target matrices and the sparse regularizer and to apply the sparse regularizer to a robust principal component analysis (RPCA) approach via decomposing one of the one or more target matrices into a sum of low-rank and sparse matrices; and
   an image reconstructor integrating outcomes of decomposition from the matrix decomposer to form one or more recovered images from the one or more degraded images, utilizing the low-rank and sparse matrices.

2. The image restoration processor of claim 1, further comprising:
   a first cache configured to receive the one or more target matrices from the matrix converter and store the one or more target matrices, wherein the matrix decomposer receives the one or more target matrices via accessing the first cache; and
   a second cache configured to receive the sparse regularizer and store the sparse regularizer, wherein the matrix decomposer receives the sparse regularizer via accessing the second cache.

3. The image restoration processor of claim 1, further comprising:
   a parameter selector configured to determine a relationship between a scale parameter of the sparse regularizer and a positive weighting parameter controlling sparsity.

4. The image restoration processor of claim 1, wherein the image data is from one or more degraded hyperspectral images.

5. The image restoration processor of claim 1, wherein the image data is from one or more degraded multispectral images.

6. The image restoration processor of claim 1, wherein the M-estimator is selected from Welsch Function, Cauchy Function, and German-McClure Function.

7. The image restoration processor of claim 1, further comprising:
a user interface configured to receive the M-estimator from an external source and transmit an information signal to inform the modifier of the received M-estimator.

8. The image restoration processor of claim 1, further comprising:
a computation module configured to perform an alternating direction method of multipliers (ADMM) approach following with the RPCA approach performed by the matrix decomposer.

9. The image restoration processor of claim 1, wherein the sparse regularizer is nonconvex and has closed-form proximity operators.

10. The image restoration processor of claim 1, further comprising:
a display electrically communicating with the image reconstructor and configured to display the recovered one or more images.

11. An image restoration processor, comprising:
an image receiver configured to receive one degraded image;
a matrix converter configured to reshape image data of the degraded image into a target matrix;
a framework memory configured to store a framework for generating one or more sparsity-inducing regularizers, which enables generation of the one or more sparsity-inducing regularizers and derivation of their theoretical properties and closed-form proximity operators;
a modifier configured to read the framework memory and apply the framework to modify more than one M-estimator and accordingly output more than one hybrid M-estimator and more than one sparse regularizer corresponding to the more than one hybrid M-estimator;
a matrix decomposer configured to receive the target matrix and the different sparse regularizers and to apply the different sparse regularizers to a robust principal component analysis (RPCA) approach via decomposing the matrix into sums of low-rank and sparse matrices;
an image reconstructor integrating outcomes of decomposition from the matrix decomposer to form more than one recovered image from the degraded image using different sparse regularizers, utilizing the low-rank and sparse matrices; and
an image selector configured to receive the recovered images from the image reconstructor and determine which one of the recovered images is to be outputted according to image evaluation metrics for all of the recovered images.

12. The image restoration processor of claim 11, further comprising:
a first cache configured to receive the target matrix from the matrix converter and store the target matrix, wherein the matrix decomposer receives the target matrix via accessing the first cache; and
a second cache configured to receive the sparse regularizer and store the sparse regularizers, wherein the matrix decomposer receives the sparse regularizers via accessing the second cache.

13. The image restoration processor of claim 11, further comprising:
a parameter selector configured to determine a relationship between scale parameters of the sparse regularizers and positive weighting parameters controlling sparsity.

14. The image restoration processor of claim 11, wherein the image data is from a degraded hyperspectral image.

15. The image restoration processor of claim 11, wherein the image data is from a degraded multispectral image.

16. The image restoration processor of claim 11, wherein the image evaluation metrics comprise SNR (Signal-to-Noise Ratio), SSIM (Structural Similarity Index), and RMSE (Root Mean Square Error).

17. The image restoration processor of claim 11, wherein the M-estimators are selected from Welsch Function, Cauchy Function, and German-McClure Function.

18. The image restoration processor of claim 17, further comprising:
a display electrically communicating with the image selector and configured to show which function is introduced as the sparse regularizer for the output recovered image.

19. The image restoration processor of claim 11, further comprising:
a display electrically communicating with the image reconstructor and configured to display the recovered image from the degraded image.

20. The image restoration processor of claim 11, further comprising:
an image comparator is configured to compare the recovered images and quantify recovery performance of the recovered images.

* * * * *